(12) United States Patent
Leuthold

(10) Patent No.: US 9,638,508 B2
(45) Date of Patent: May 2, 2017

(54) OFFSET REDUCTION FOR DISPLACEMENT SENSOR

(71) Applicant: Seagate Technology LLC, Cupertino, CA (US)

(72) Inventor: Hans Leuthold, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 657 days.

(21) Appl. No.: 14/163,953

(22) Filed: Jan. 24, 2014

(65) Prior Publication Data

US 2014/0139237 A1 May 22, 2014

Related U.S. Application Data

(63) Continuation-in-part of application No. 14/084,611, filed on Nov. 19, 2013, which is a continuation-in-part of application No. 13/363,713, filed on Feb. 1, 2012, now Pat. No. 9,163,925.

(51) Int. Cl.
| | |
|---|---|
| *G01R 27/02* | (2006.01) |
| *G01B 7/02* | (2006.01) |
| *G11B 5/55* | (2006.01) |
| *G11B 5/596* | (2006.01) |

(52) U.S. Cl.
CPC .......... *G01B 7/023* (2013.01); *G11B 5/5582* (2013.01); *G11B 5/59627* (2013.01); *G11B 5/59694* (2013.01)

(58) Field of Classification Search
CPC ........ G01B 7/14; G01B 7/023; G11B 5/5582; G11B 5/59627; G11B 5/59694
See application file for complete search history.

(56) References Cited

U.S. PATENT DOCUMENTS

| | | | |
|---|---|---|---|
| 4,074,184 A | 2/1978 | Dechene et al. | |
| 4,972,189 A * | 11/1990 | Polito | H03M 1/1023 341/118 |
| 4,983,916 A | 1/1991 | Iijima et al. | |
| 5,034,829 A | 7/1991 | Mahr | |
| 5,130,661 A | 7/1992 | Beck et al. | |
| 5,473,461 A * | 12/1995 | Miremadi | H04B 10/114 250/214 B |
| 5,566,673 A | 10/1996 | Shiono et al. | |
| 5,736,800 A | 4/1998 | Iannello et al. | |
| 5,962,940 A | 10/1999 | Imlach | |
| 6,140,790 A | 10/2000 | Heine et al. | |
| 6,170,162 B1 | 1/2001 | Jacobsen et al. | |
| 6,201,322 B1 | 3/2001 | Heine et al. | |

(Continued)

OTHER PUBLICATIONS

Swann et al., "Non-Repeatable Runout Measurement and Simulation of Fluid Lubricated Spindles," IEEE Transactions on Magnetics, vol. 32, No. 3, pp. 1727-1732, 1996. 6 pages.

*Primary Examiner* — Daniel Miller

(57) ABSTRACT

A device including a displacement measurement circuitry and a charge adjuster circuitry is disclosed. The displacement measurement circuitry may be configured to measure displacement associated with a rotating object. The charge adjuster circuitry is coupled to the displacement measurement circuitry. The charge adjuster circuitry is configured to measure an offset associated with ambient noise in the device over time. The charge adjuster circuitry is further configured to adjust sensors of the displacement measurement circuitry to reduce the measured offset.

19 Claims, 16 Drawing Sheets

(56) References Cited

U.S. PATENT DOCUMENTS

| | | |
|---|---|---|
| 6,505,968 B1 | 1/2003 | Fleury et al. |
| 6,592,430 B1 | 7/2003 | Nakasuji et al. |
| 6,603,221 B1 | 8/2003 | Liu |
| 6,603,225 B2 | 8/2003 | Heine et al. |
| 7,046,477 B2 | 5/2006 | Shibata |
| 7,155,826 B2 | 1/2007 | Wehrfritz |
| 7,370,524 B2 | 5/2008 | Hopkins |
| 7,633,705 B2 | 12/2009 | Sudo |
| 9,163,925 B1 | 10/2015 | Leuthold |
| 2002/0074883 A1 | 6/2002 | Yamauchi et al. |
| 2005/0094523 A1 | 5/2005 | Wu |
| 2008/0024209 A1* | 1/2008 | Gibson ............... H03F 3/45183 330/3 |
| 2008/0037155 A1 | 2/2008 | Hirano et al. |
| 2009/0091287 A1 | 4/2009 | Bastholm |
| 2009/0164145 A1 | 6/2009 | Koo et al. |
| 2009/0237282 A1 | 9/2009 | Hartlieb et al. |
| 2011/0141617 A1 | 6/2011 | Sudo |
| 2014/0077822 A1 | 3/2014 | Leuthold |
| 2014/0139237 A1 | 5/2014 | Leuthold |

\* cited by examiner

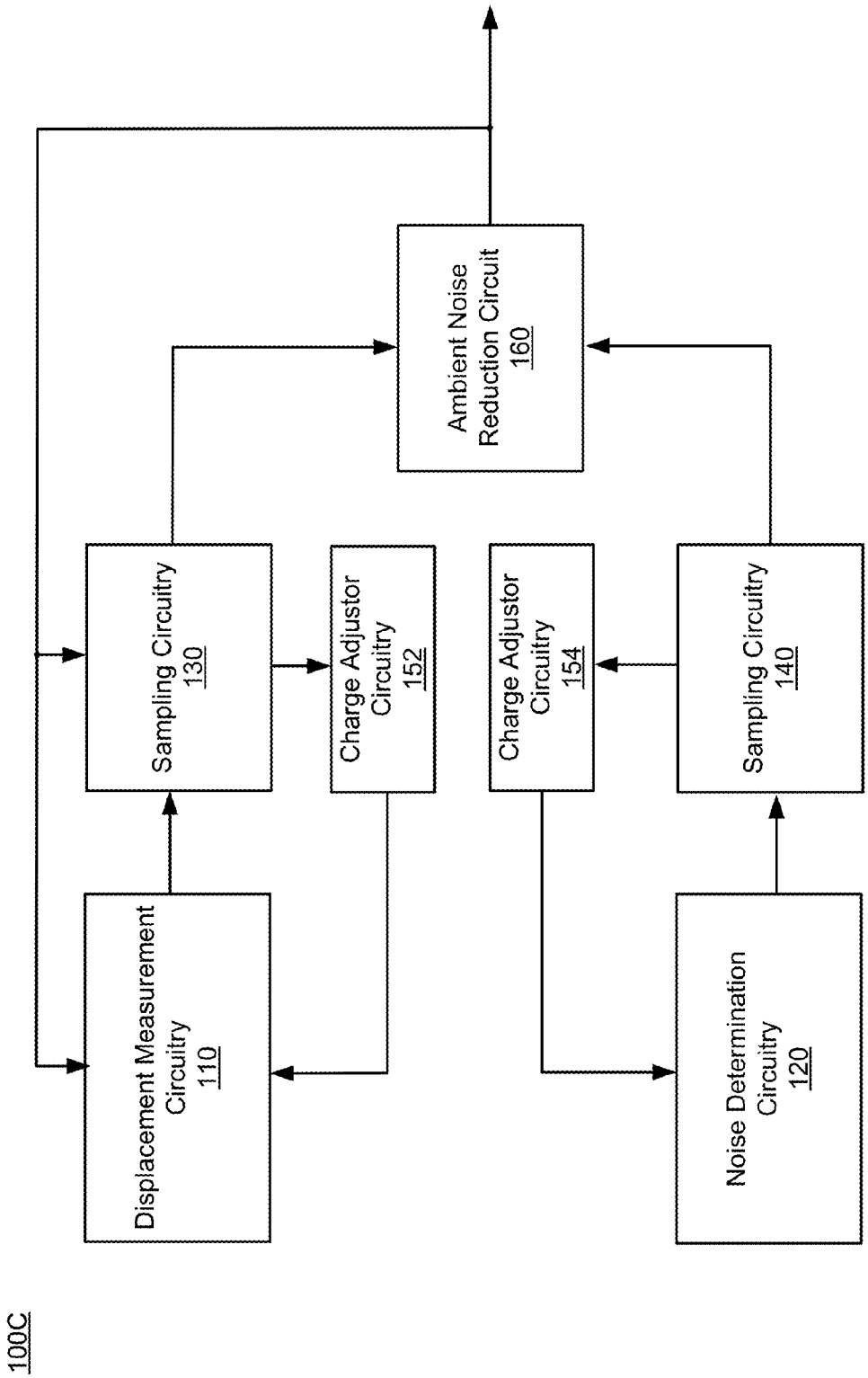

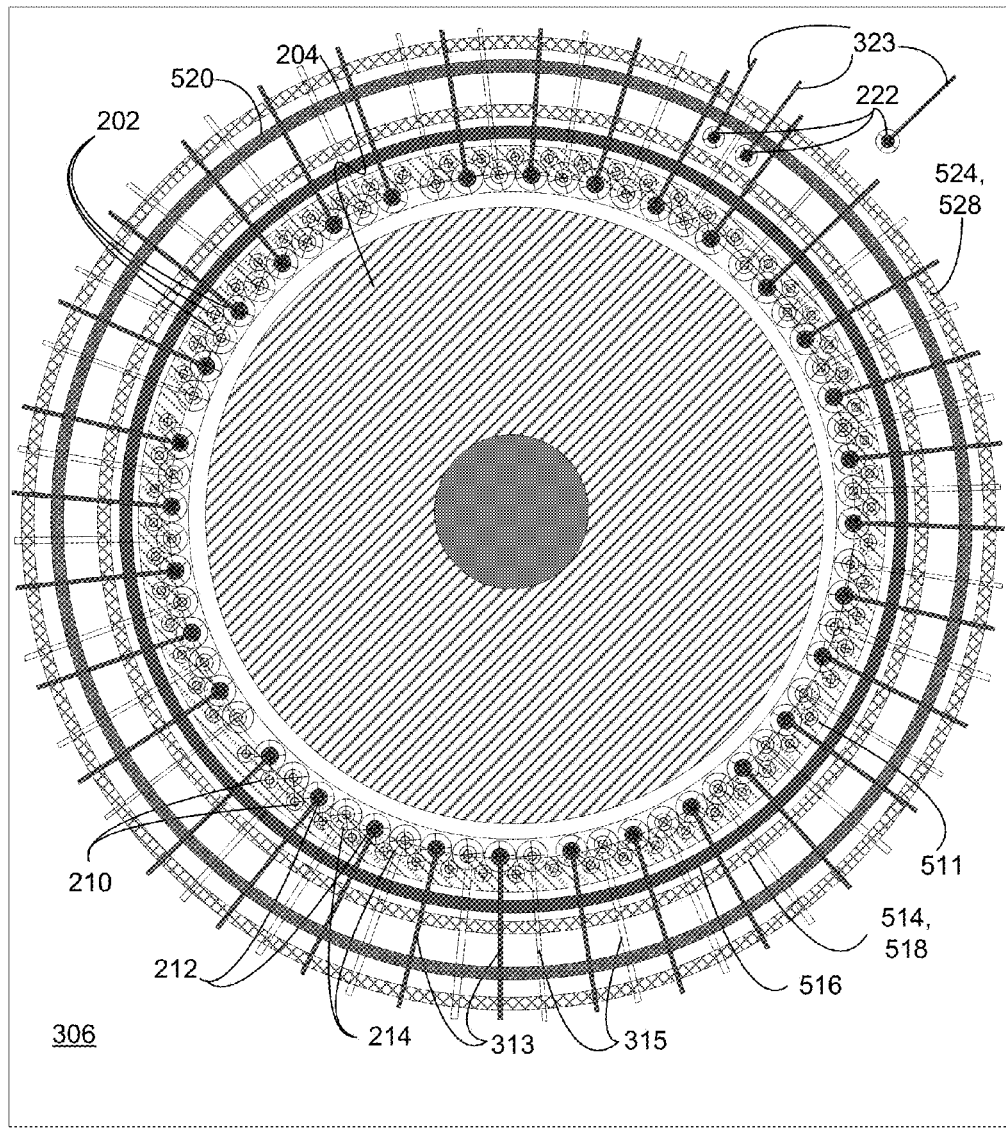
Figure 5A
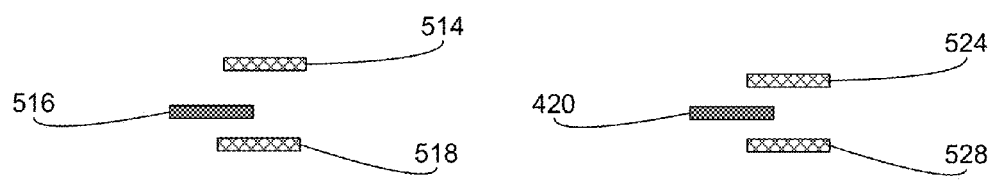 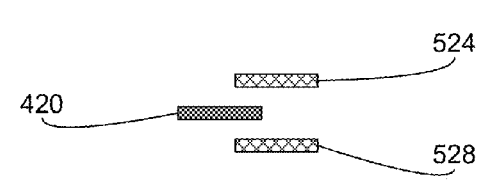
Figure 5B　　　　　　　　Figure 5C

OFFSET REDUCTION FOR DISPLACEMENT SENSOR

RELATED APPLICATIONS

This application is a continuation-in-part of and claims priority to and the benefit of U.S. patent application Ser. No. 14/084,611, titled "NOISE MEASUREMENT FOR MEASURED DISPLACEMENT", filed on Nov. 19, 2013, which is a continuation-in-part of and claims priority and benefit to U.S. patent application Ser. No. 13/363,713, titled "ELECTRIC FIELD MEASUREMENT APPARATUS", filed on Feb. 1, 2012, the disclosures of which are incorporated by reference in their entirety.

BACKGROUND

In magnetic recording media, as used in hard disk storage devices, information is written to and read from magnetic elements that represent digital bits. In order to increase the amount of information that can be stored within a given area, the size and distance between these magnetic elements may be reduced so that they may be more densely positioned. At the same time, the speed at which disks are written to and read from when preparing the disks for use by an end-user may be increased. In general, information regarding location as a function of time of the spin axis of the disks is useful in increasing performance.

Noise and vibration in the disks' environment may impact the performance, e.g., read/write capability, of magnetic recording media. The interferences caused by rapid disk rotation and other interferences may further cause random radial displacement or eccentricity of the rotating disk, resulting in non-repetitive run-out.

SUMMARY

A device including a displacement measurement circuitry and a charge adjuster circuitry is disclosed. The displacement measurement circuitry may be configured to measure displacement associated with a rotating object. The charge adjuster circuitry is coupled to the displacement measurement circuitry. The charge adjuster circuitry is configured to measure an offset associated with ambient noise in the device over time. The charge adjuster circuitry is further configured to adjust sensors of the displacement measurement circuitry to reduce the measured offset.

BRIEF DESCRIPTION OF THE DRAWINGS

Embodiments of the present invention are illustrated by way of example, and not by way of limitation, in the figures of the accompanying drawings.

FIGS. 1A-1D show offset reduction circuitry for sensor elements measuring displacement and ambient noise according to some embodiments.

FIG. 5A is a plan view of floating rings and sensing rings according to some embodiments.

FIG. 5B is a cross sectional view of floating rings and sensing rings of displacement measurement electrodes according to some embodiments.

FIG. 5C is a cross sectional view of floating rings and sensing rings of electrodes for measuring ambient noise according to some embodiments.

DETAILED DESCRIPTION

Figure 1A:
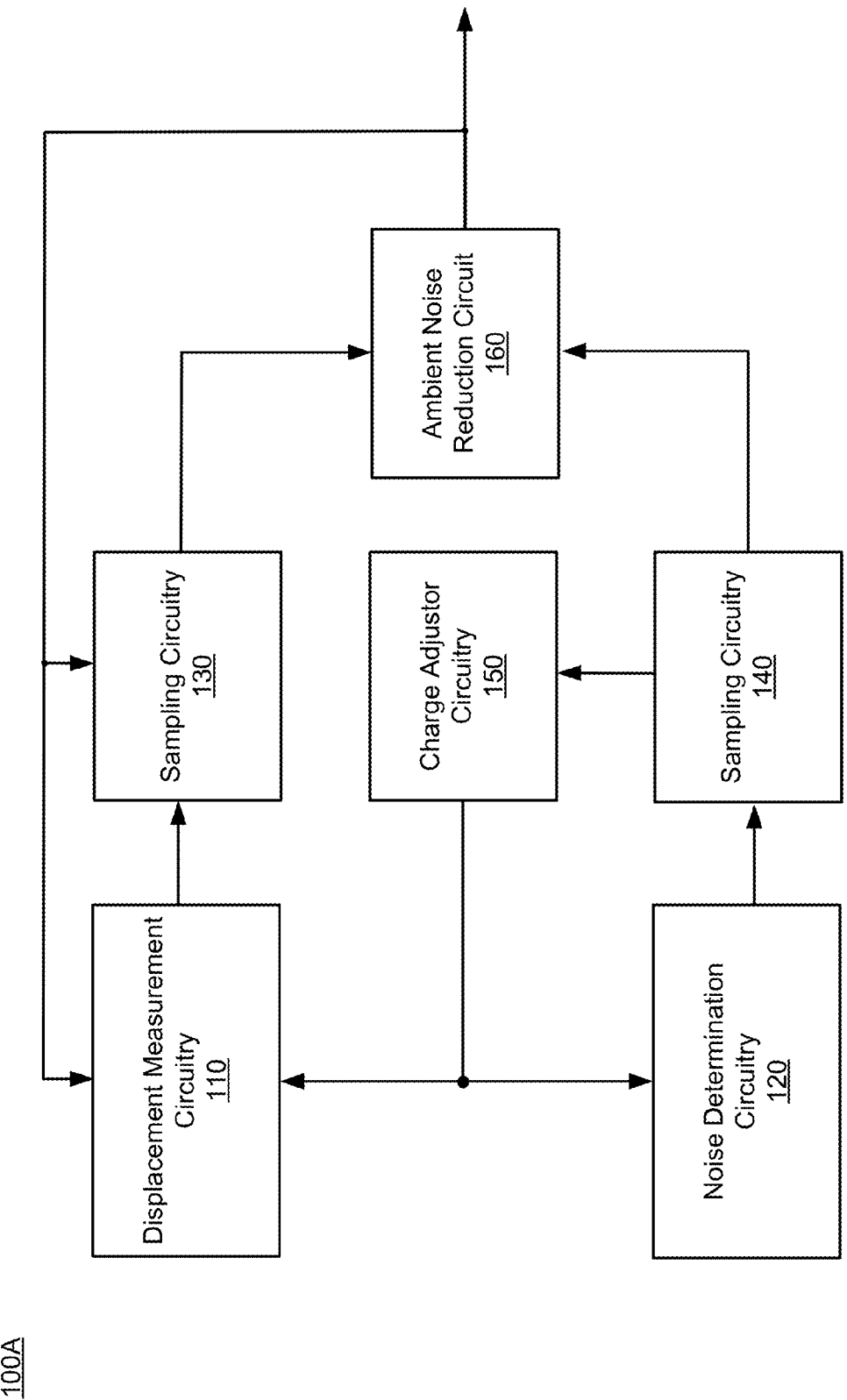

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments described herein provide measurement methods and systems for determining the displacement or run-out of a rotating disk, for example, hard disks that store data. Displacement measurement may also be used in other applications. For example, displacement may be measured and compensated for in a cryogenic/high vacuum pump where the displacement may result from the position of the pump with respect to earth's gravity and may further result from temperature dependent tolerances. Another example of measuring and compensating for the displacement is in vibration of the drive shaft in a submarine that may result from placement and assembly tolerances of bearings, sensors, and actuators along the shaft as well as hull deformation under the load of the submarine. Moreover, embodiments herein provide for measurement of ambient noise, thereby allowing the ambient noise to be removed from the measured displacement. As such, amplitude, frequency, and phase of the correlated or non-correlated displacement of a rotating disk and its respective ambient noise can be measured. It is appreciated that embodiments described herein can be applied to any rotating object to determine rotational displacement.

It is further appreciated that embodiments herein provide for reducing offset, e.g., a DC component, resulting from various inaccuracies throughout the circuit. For example, non-repetitive signals over time should theoretically be zero, however, in practice inaccuracies may cause the non-repetitive signals to have a non-zero value resulting in an offset. As such, reducing the offset is desired in order to yield better performance and a better measurement of the displacement.

Embodiments described herein are equally applicable to any rotating object. For example, embodiments described herein are equally applicable to rotating machinery, such as lathes or computer numerical control (CNC) machining centers used for the manufacturing of mechanical parts. Yet another range of applications might be found in the control of spinning mirrors used in laser scanners in cache registers and such, or with the control of electromagnetic bearings of fast spinning cryogenic pumps.

A rotating disk may include both repetitive (correlated) run-out and non-repetitive (uncorrelated) run-out. Non-repetitive run-out of the disk may be caused by random vibrations or other types of random disturbances in the environment. Repetitive run-out of the disk may be caused by an imbalance of a disk stack if the disk is included in a stack of disks.

In various embodiments, an electric field may be formed around the disk, or the body holding a stack of disks, by displacement sensors. For example, biasing electrodes may be biased to form an electric field. A first set of floating electrodes in close proximity of the moving object, e.g., rotor, may be used to measure changes in the electric field due to a displacement of the disk to determine the repetitive run-out and non-repetitive run-out of the rotating disk. The first set of floating electrodes is coupled to the moving object, e.g., rotor, and modulated. The first set of floating electrodes detects a capacitance resulting from displacement of the moving object. Accordingly, displacement of the moving object may be measured.

It is appreciated that the measured displacement may include ambient noise, e.g., from circuitries, from florescent light, electrical noise, etc. The ambient noise is measured in order to remove the ambient noise from the measured displacement. In one embodiment, ambient noise is measured using a second set of floating electrodes. The second set of floating electrodes is positioned further away from the moving object in comparison to the first set of floating electrodes. For example, if the first set of floating electrodes forms an inner ring surrounding the moving object, the second set of floating electrodes forms an outer ring surrounding the moving object. The second set of floating electrodes detects a signal that is not modulated by the moving body. Accordingly, the ambient noise is measured and can subsequently be removed from the measured displacement by the first set of floating electrodes.

The non-repetitive run-out of the disk may be orders of magnitude less than the repetitive run-out. For at least this reason, the signal corresponding to the non-repetitive run-out may be weak compared to the signal of the repetitive run-out. Moreover, due to the possible non-ideal positioning or structure of a printed circuit board (PCB) near the rotating disk or displacement sensors, additional noise such as ambient noise may be introduced to the overall signal. Such noise from a PCB and its elements may be repetitive noise because the noise corresponding to each position of the electric field will be known and therefore non-random. As a result of both the repetitive and non-repetitive run-out, the signal-to-noise ratio (SNR) of the non-repetitive run-out to the repetitive run-out may be low. It is appreciated, however, that the ambient noise may be measured and compensated for using the second set of floating electrodes further away from the moving object in comparison to the first set of floating electrodes.

Furthermore, it is appreciated that offsets associated with non-repetitive run-out may be measured by aggregating them over time to determine whether they are positive or negative. The measured offset may then be compensated for by adjusting the set point associated with the capacitances of the electrodes used for measuring displacement and/or ambient noise.

Embodiments described herein allow for the measurement of a rotating disk's repetitive run-out as well as non-repetitive run-out (NRRO). To determine the non-repetitive run-out of the disk, an electric field may be formed around the disk and measurements of the changes in the electric field due to displacement of the disk may be oversampled to increase the SNR.

Oversampling is the process of sampling a signal with a sampling frequency that is equal to or greater than the Nyquist rate, or twice the highest frequency of the signal being sampled. For example, the signal measured by the first set of floating electrodes may be sampled at a frequency that is equal to or greater than twice the highest frequency of the non-repetitive run-out. To decrease the noise and increase the sampling resolution of the signal, a higher sampling frequency may be used. For example, when the sampling frequency is doubled, the sampling resolution is doubled, which results in half the noise after the signal is averaged or filtered down to the required rate.

In some embodiments oversampling a signal corresponds to each position of a plurality of positions of the electric field to determine the non-repetitive run-out component of the signal. For example, a first sample of the electric field's polarity and amplitude may be measured at a first position of the field and stored. The electric field may then be rotated to the next position where the next sample of the electric field's polarity and amplitude may be measured and stored. In this manner, the electric field may be rapidly stepped through a full revolution, e.g., 360 degrees, while the electric field's polarity and amplitude are measured and stored at each rotational position.

Once the electric field has completed a first full revolution, a second sample of the electric field's polarity and amplitude may be measured at the first position of the field. The average value of the previous and current samples of the electric field in each position may be stored. Accordingly, in the foregoing example, the average value of the first and second sample is stored in place of the value of the first sample. The electric field may then continue to rotate to complete a second full revolution while measurements of the electric field at each position are averaged or integrated with the previous measurement for each corresponding position, respectively.

Again, once the electric field has completed a second full revolution, a third sample of the electric field's polarity and amplitude may be measured at the first position of the field. The third sample may be averaged with the previously stored value, namely, the average of the first and second sample.

As the electric field completes additional rotations, the samples for each additional rotation may be averaged with the stored samples that correspond to each position of the electric field. As the stored values for each position continue to be integrated with sample values from additional positions, the repetitive noise may be determined with more accuracy. Once the repetitive noise has been determined, the repetitive noise can then be subtracted from the signal and the remaining signal may reveal the non-repetitive run-out component of the signal.

It is appreciated that the ambient noise may also be measured and compensated for in measuring displacement. The ambient noise may be measured using the second set of floating electrodes that is positioned further away from the moving object in comparison to the first set of floating electrodes. It is appreciated that the second set of floating electrodes may operate substantially similar to the first set of floating electrodes. However, the second set of floating electrodes measure the ambient noise rather than the displacement of the moving object because the detected signal by the second set of floating electrodes is not modulated by the moving object (partly because of its distance to the moving body). The measured ambient noise may be removed since it is also present in the measured displacement by the first set of floating electrodes. As such, ambient noise is removed from the displacement measurement.

According to some embodiments, offset associated with non-repetitive run-outs may be measured. For example, an integrator may be used to aggregate the measured ambient noise. Theoretically the aggregated measured ambient noise should be zero over time because they are random. However, in practice the aggregation results in a net amount (hereinafter referred to as an offset), e.g., a DC component. The offset may be the result of various inaccuracies within the circuit. Adjusting the set point associated with the capacitances of the electrodes that measure the displacement and/or the ambient noise may compensate for the measured offset. For example, the voltage associated with one plate of the capacitor forming the electrode or sensor that measures the displacement or the ambient noise may be adjusted.

In general, displacement measurement is very small in magnitude in comparison to repetitive signals and ambient noise. As such, removal of ambient noise, for instance, from the measured displacement results in a much more accurate measurement of displacement. In order to illustrate this point, a non-limiting analogy is provided. In this analogy, one may consider detection of moving bodies under similar conditions, e.g., a dark room, using cameras. Using two identical cameras pointing in the same direction that are physically positioned in close proximity to one another to scan the area synchronously results in similar measurements including the measurement of ambient noise. However, one of the cameras may be unable to detect any small optical details if it is out of focus. In this example, both cameras are in the presence of poor lighting conditions, ambient electrical and thermal noise sources, etc. Since the overall light falling on each lens is the same and since the cameras are scanning in synchronously, electrical and thermal noise are the same for both cameras. However, there is a difference in optical details between the two since one camera is in focus and one is out of focus. As a result, the difference between the two cameras provides a much more enhanced detection of the moving object by removing the noise.

Similarly, in embodiments described herein, one set of sensors may be used to detect displacement and ambient noise whereas another set of sensors may be used not to measure displacement (out of focus in the analogy above), thereby measuring ambient noise. The difference between the two measurements is displacement of a moving object, e.g., a disk, without ambient noise.

According to some embodiments, an offset may still be present after the ambient noise is removed from the measured displacement. In order to reduce any offset remaining from the measured displacement after the ambient noise is removed, a second integrator and a signal gain adjuster may be used. The second integrator aggregates the displacement signal over time, after the ambient noise is removed and results in an offset. The signal gain adjuster may use the measured offset to further adjust the set point associated with capacitances of the electrodes/sensors measuring displacement.

In various embodiments, the sampling frequency may be increased beyond twice the highest frequency of the signal being sampled. For example, if the typical amplitude of the repetitive run-out is 1,000 times greater than the typical amplitude of the non-repetitive run-out, the signal may be oversampled 1,000 times more. In some embodiments, the more than one sample may be taken at each position of the electric field before the electric field rotates to the next position. For example, if the electric field rotates at 25 MHz, samples may be taken at 100 MHz so that four samples are taken at each position of the electric field.

In various embodiments, the dominant disk mode may have a non-repetitive run-out with a bandwidth of 2 kHz. If an 8-bit angular resolver is used (allowing for 256 sample points), and if the disk spins at 12,000 rpm (or 200 Hz), then the run-out samples may pass at a frequency of 256×200 Hz, or roughly 50 kHz. If the maximum typical repetitive run-out is on the order of $1\times10^{-3}$ inch and the non-repetitive run-out is on the order of $1\times10^{-6}$ inch, then the non-repetitive run-out is a factor of 1,000 smaller than the repetitive run-out. As a result, 1,000 samples may be taken at a rate of 4 per rotation at 200 Hz to filter the measurements of run-out to determine the non-repetitive run-out component of the measurements. Accordingly, the electric field will rotate at a rate of 800 kHz or 16 samples for every click of a register storing values corresponding to run-out. Further, there may be at least one full revolution of the electric field, e.g. 32 positions, for every one of the 16 samples collected. As a result, a basic clock rate of 32×800 kHz, or 25.6 MHz, may be used.

Referring now to FIGS. 1A-1D, offset reduction circuitry for sensor elements measuring displacement and ambient noise according to some embodiments are shown. Referring specifically to FIG. 1A, embodiment 100A includes displacement measurement circuitry 110, noise determination circuitry 120, sampling circuitries 130 and 140, charge adjuster circuitry 150, and ambient noise reduction circuitry 160. It is appreciated that the displacement measurement circuitry 110 and the noise determination circuitry 120 may be referred to as the sensing circuitry. However, it is appreciated that the sensing circuitry may include the displacement measurement circuitry 110 or the noise determination circuitry 120 but not both in some embodiments.

The displacement measurement circuitry 110 is configured to measure displacement associated with a rotating object, e.g., a hard disk. The noise determination circuitry 120 is configured to measure noise, e.g., from circuitries, from florescent light, electrical noise, etc. Noise measurement is referred to as ambient noise hereinafter. It is appreciated that the implementation and operations of the displacement measurement circuitry 110 and the ambient noise measurement circuitry 120 are described in more detail with respect to FIGS. 2A-7 below.

According to one embodiment, the measured displacement and the measured ambient noise are sampled using the sampling circuitries 130 and 140 respectively. However, it is appreciated that in some embodiments analog signals may be used and the sampling circuitries 130 and 140 may be eliminated.

In one exemplary embodiment, the ambient noise reduction circuitry 160 may be used in order to remove the measured ambient noise from the measured displacement. In one embodiment, the ambient noise reduction circuitry 160 may include a difference amplifier in order to remove the ambient noise from the measured displacement.

In one embodiment, the sampled measured noise is fed from the sampling circuitry 140 to the charge adjuster circuitry 150. Theoretically because the measured ambient noise is non-repetitive in nature, aggregating the measured ambient noise over time should be zero. In practice, however, aggregation of ambient noise over time may be non-zero due to inaccuracies in the device, thereby resulting in an offset or a DC component. The measured offset may be compensated for and reduced by adjusting the set point associated with the sensors comprising electrodes that measure the displacement and/or the ambient noise. As a result, a more accurate measurement may be achieved. It is appreciated that the set point may be related to capacitance formed along the opposite sides of a rotating body, e.g., hard disk drive, and it may be adjusted by adjusting the lower and upper voltages associated with the upper and lower plates of the capacitor respectively. In other words the set point may be defined according to the following equation:

$$C_{upper}*(V_{upper}-V_{Setpoint})=C_{Lower}*(V_{Setpoint}-V_{Lower}).$$

It is appreciated that the offset may also result from non-linearity of the equation above. Replacing the capacitance terms above with their dimensional equivalents in terms of plate size and plate distance results in a non-linearity because the denominator and distance effects at the fringes are non-linear. Accordingly, the above equation results in an offset in a rotating object, e.g., sensors measuring displacement and ambient noise over 360 degrees of rotation.

It is appreciated that in one embodiment, the charge adjuster circuitry 150 may use the information associated with the noise determination circuitry 120 because ambient noise is theoretically random and aggregating it over time removes the measured ambient noise from the system, leaving the offset associated with inaccuracies in the device. In one embodiment, the charge adjuster circuitry 150 may include an integrator to aggregate the measured ambient noise over time. In one embodiment, the charge adjuster circuitry 150 may include a counter that increments when the measured ambient noise is above a threshold and decrements when the measured ambient noise is below that threshold.

The charge adjuster 150 may use the measured offset to adjust the sensors of the displacement measurement circuitry 110 and the noise determination circuitry 120 in order to reduce the impact of the offset. For example, in one implementation where the sensors of the displacement measurement circuitry 110 and the noise measurement circuitry 120 are electrodes with respective capacitances, the charge adjuster circuitry 150 may use a plurality of switches to control the amount of charge on a plate of a respective electrode to adjust capacitances of the sensors, thereby reducing the measured offset. For example, for positive offsets, the plurality of switches may close/open in a manner to adjust one or more plates of the sensors to carry a negative charge in order to compensate for the positive offset and vice versa. It is appreciated that adjusting the charge on a plate of a capacitor may also be referred to as adjusting the capacitor's set point.

It is appreciated that adjusting for the offset may occur continuously through a feedback loop, in one instance. However, it is appreciated that in other embodiments, the offset may be adjusted once or a set number of times after which point it remains unchanged.

Figure 1B:
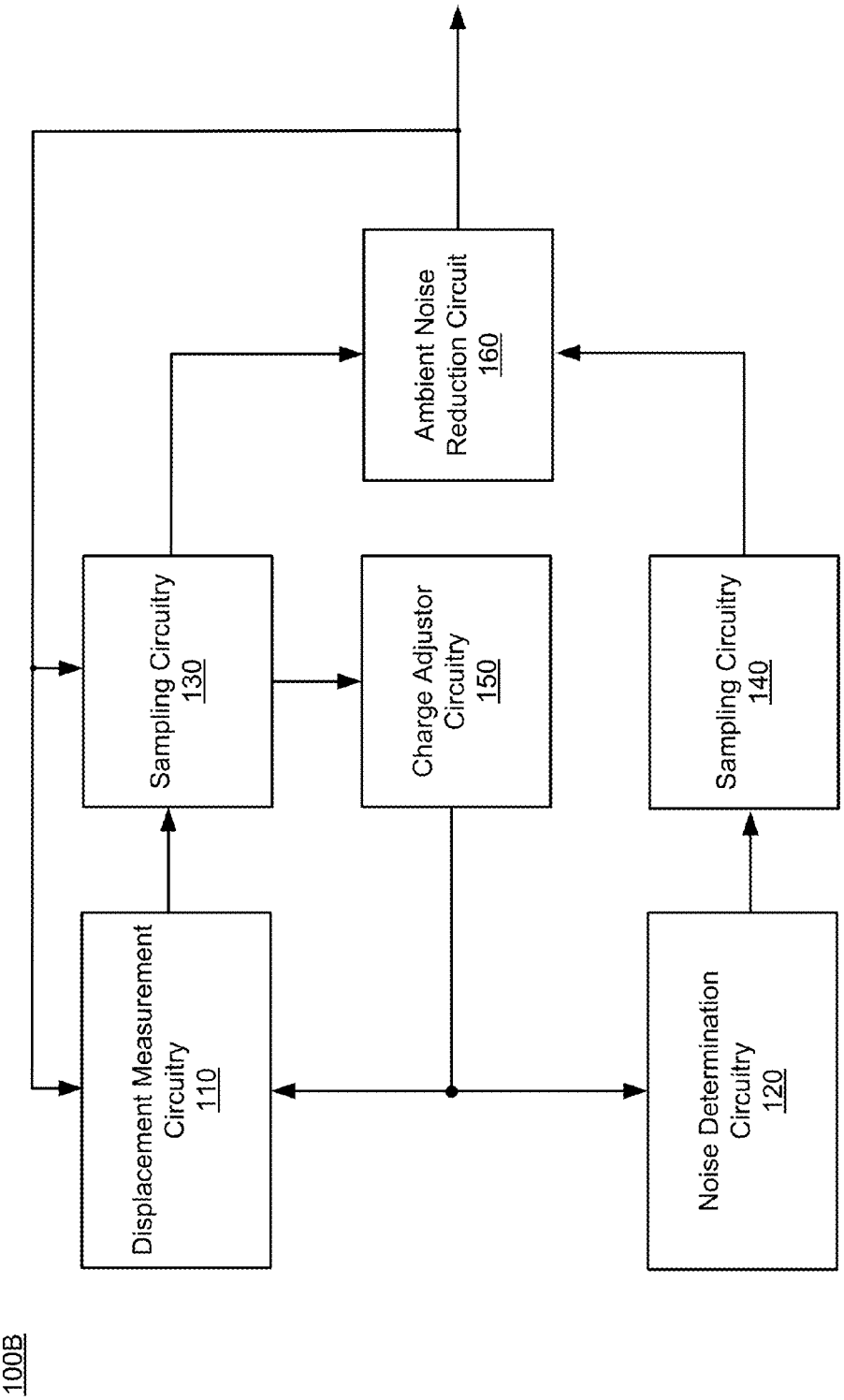

Referring now to FIG. 1B, embodiment 100B is disclosed. It is appreciated that embodiment 100B is substantially similar to embodiment 100A except that the charge adjuster circuitry 150 is coupled to the sampling circuitry 130 instead of the sampling circuitry 140. In this embodiment, the charge adjuster circuitry 150 measures the offset by aggregating the measured displacement instead of using the measured ambient noise. Because the measured displacement is repetitive in nature it can be removed by the charge adjuster circuitry 150 and the offset remains. The remainder of embodiment 100B operates substantially similar to that of 100A.

Referring now to FIG. 1C, embodiment 100C is disclosed. It is appreciated that embodiment 100C is substantially similar to embodiments 100A and 100B. However, in embodiment 100C, the displacement measurement circuitry 110 has its own respective charge adjuster circuitry 152 and the noise determination circuitry 120 has its own charge adjuster circuitry 154. The charge adjuster circuitries 152 and 154 operate substantially similar to that of charge adjuster circuitry 150 in embodiments 100A and 100B. However, the charge adjuster circuitry 152 measures the offset associated with the displacement measurement circuitry 110 exclusively while the charge adjuster circuitry 154 measures the offset associated with the noise determination circuit 120. Accordingly, the set point associated with the sensors of displacement circuitry 110 can be adjusted independently of the sensors of the noise measurement circuitry 120 if the offset associated with the displacement measurement circuitry 110 is different from the noise determination circuitry 120.

Figure 1D:
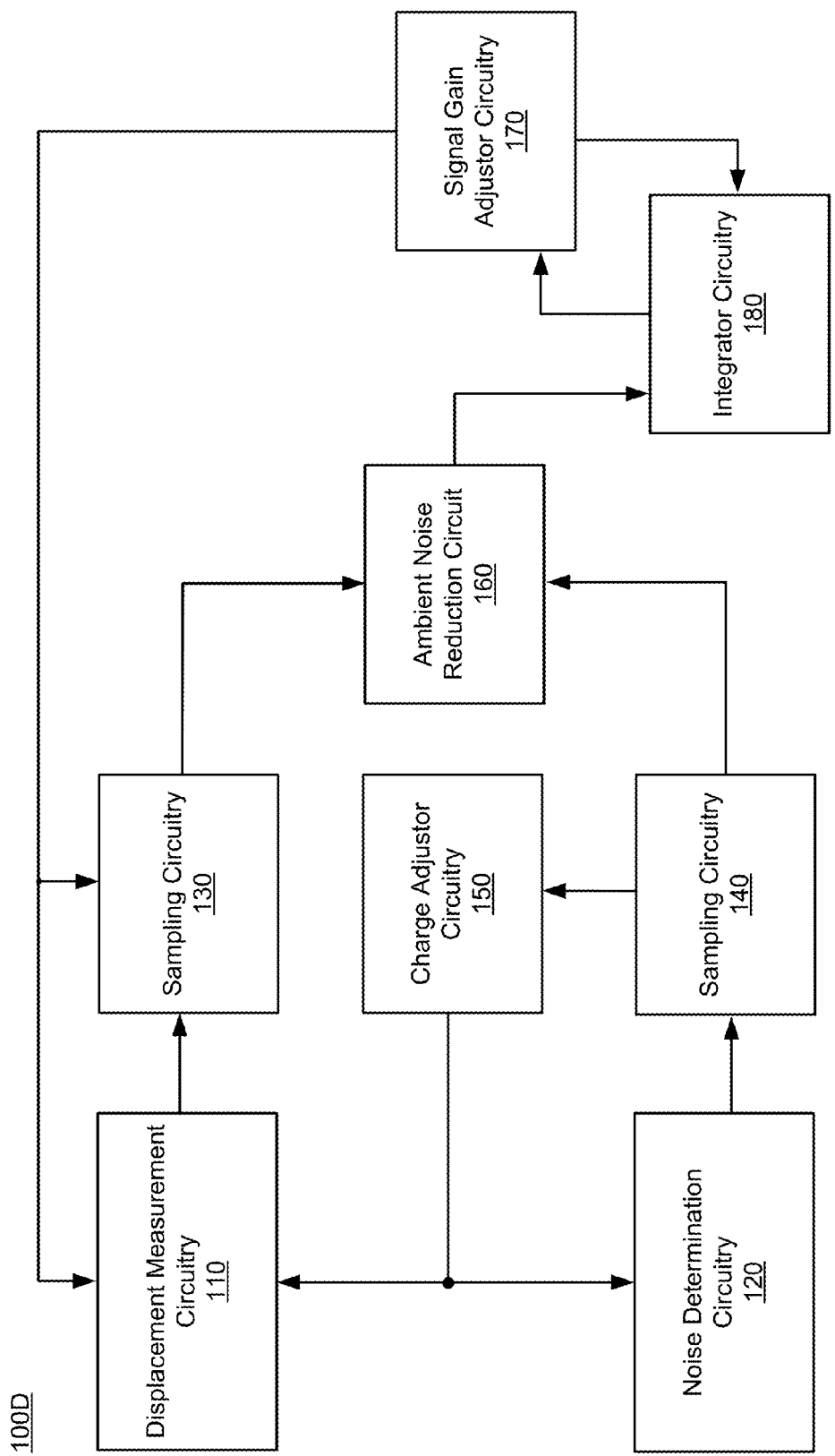

Referring now to FIG. 1D, embodiment 100D is shown. Embodiment 100D operates substantially like embodiment 100A except that embodiment 100D include a signal gain adjustor circuitry 170 and an integrator circuitry 180 in order to remove additional offsets from the device. In this embodiment, the integrator circuitry 180 may be similar to the charge adjustor circuitry 150 and aggregate the measured displacement signal after the ambient noise is removed. The aggregation results in an offset if additional inaccuracies are present in the device. The measured offset associated with the measured displacement after ambient noise is removed may be sent to the signal gain adjustor circuitry 170 for controlling a plurality of switches of the displacement measurement circuitry 110 in order to reduce the offset. For example, one or more switches may be open/closed for controlling and adjusting the charge associated with a plate of a capacitor in the displacement measurement circuitry 110. In other words, the set point associated with capacitors of the displacement measurement circuitry 110 (sensors of the displacement measurement circuitry) that measure displacement may be adjusted further using the signal gain adjuster circuitry 170.

It is appreciated that reducing the offset in both the displacement measurement circuitry 110 and the noise determination circuitry 120 is exemplary. For example, a similar embodiment may be used to reduce the offset in the displacement measurement circuitry 110 and not in the noise determination circuitry 120 and vice versa. As such, reducing the offset in both the displacement measurement circuitry 110 and the noise determination circuitry 120 is exemplary and not intended to limit the scope of the embodiments.

Figure 2A:
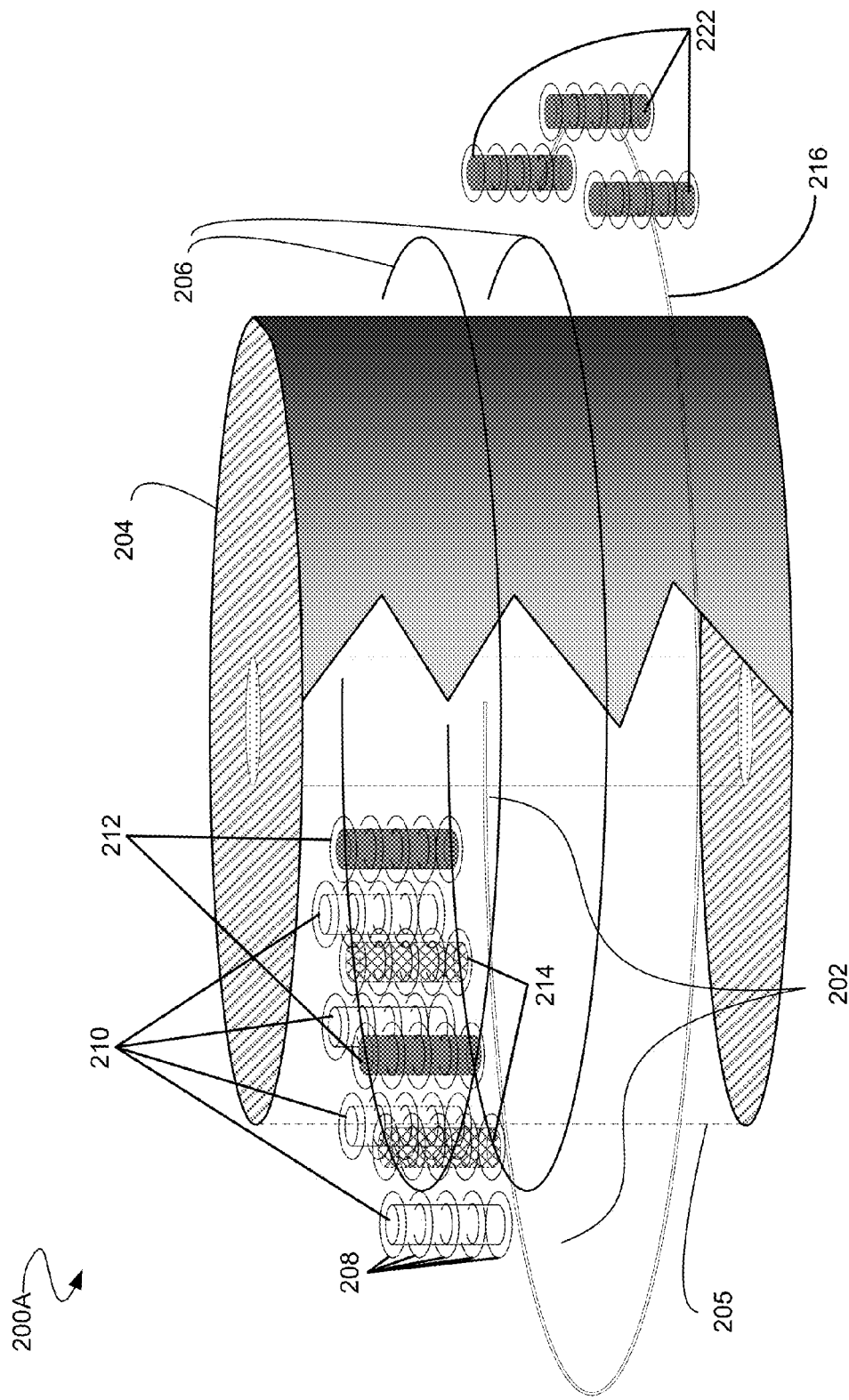
FIGS. 2A-2B are side views of sensor elements for measuring displacement and ambient noise according to some embodiments.
Figure 2B:
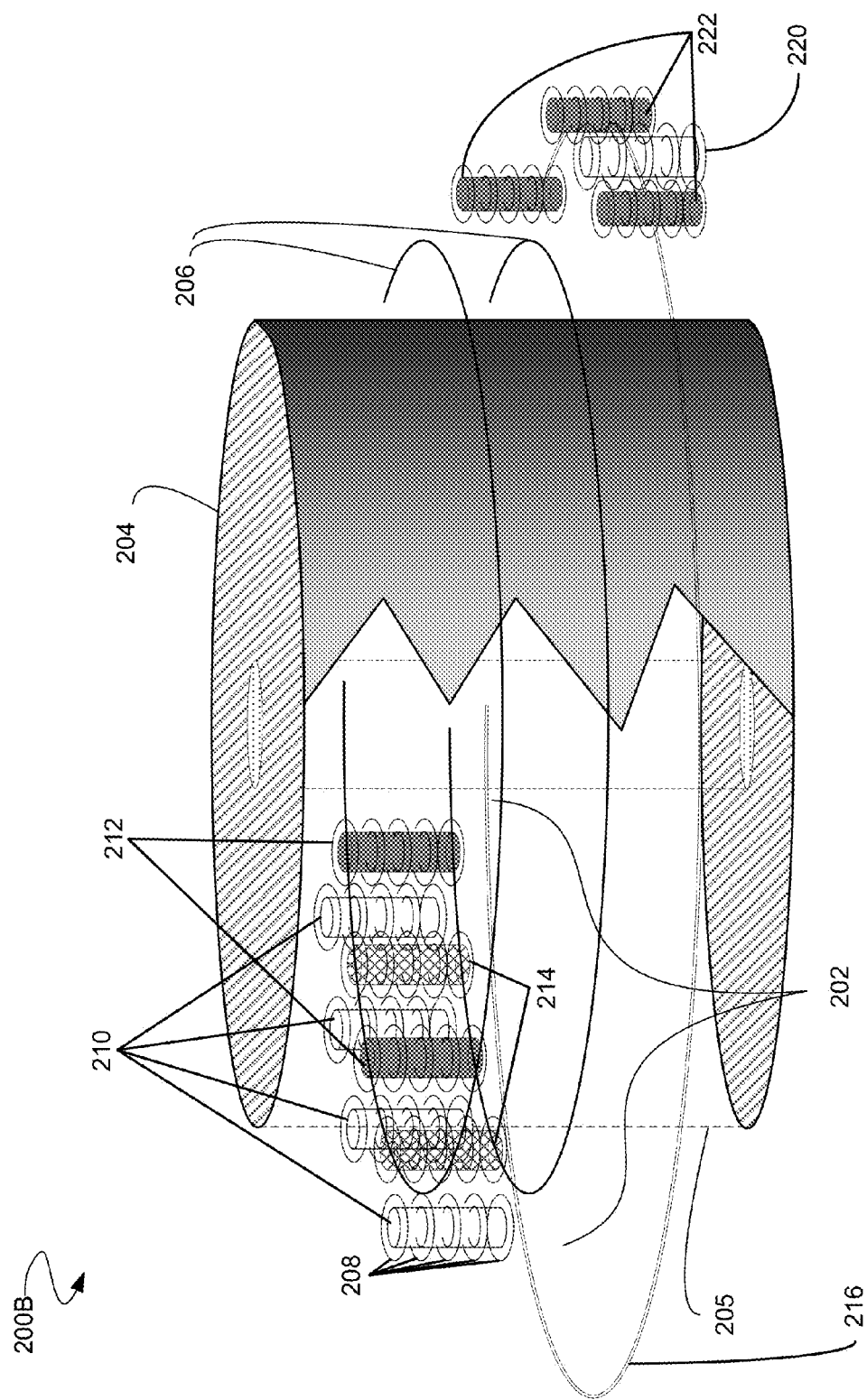

Referring now to FIGS. 2A-2B, side views of sensor elements for measuring displacement and ambient noise according to some embodiments are shown. More specifically, referring to FIG. 2A electrodes 202 adjacent to a rotating disk 204 according to an embodiment are shown. In an embodiment, the electrodes 202 may constitute elements of a displacement sensor to measure displacement of the rotating disk 204 and electrodes 222 may be used to measure ambient noise. The electrodes 202 may include grounding electrodes 210, floating electrodes 212, and biasing electrodes 214, functionality of which are described further below.

In various embodiments, the electrodes 202 may be generally positioned on the outside edge 205 of the disk 204 and on the same radial plane as the rotation of the disk 204. For example, with reference to the disk's 204 rotation, the electrodes 202 may follow the trajectory 206 shown in FIG. 2A. In this example, the floating electrodes 212 and the biasing electrodes 214 form an inner ring trajectory and the grounding electrodes 210 form an outer ring trajectory. The grounding electrodes 210 may form an outer ring that is concentric with and outside the disk 204. The floating electrodes 212 and biasing electrodes 214 may form an inner ring that is also concentric with and outside of the disk 204 but positioned inside the outer ring formed by the grounding electrodes 210. In an embodiment, the electrodes that form the outer ring or the inner ring may be distributed evenly so that each electrode is equidistant from adjacent electrodes. For example, the grounding electrodes 210 may be distributed in a pitched fashion along the outer ring. In further embodiments, the floating electrodes 212 and biasing electrodes 214 may be distributed in an alternating fashion along the inner ring.

It is appreciated that formation of two ring electrodes, e.g., an inner ring and an outer ring, is exemplary and not intended to limit the scope. For example, the floating electrodes 212, biasing electrodes 214, and the grounding electrodes 210 may form a single ring trajectory or alternatively they might form three rings. Furthermore, it is appreciated that the electrodes 202 may not form a ring per se, but rather have a structure other than a ring formation, e.g., rectangular, square, elliptical, random, etc.

According to some embodiments, electrodes 222 may be positioned further away from the rotating disk 204 in comparison to the floating electrodes 212. Electrodes 222 measure ambient noise such that the measured ambient noise can be removed from the measured displacement. Functionality of electrodes 222 and 202 are described below.

According to one embodiment, electrodes 222 may follow the trajectory 216 as shown in FIG. 2A. Electrodes 222 may also be floating electrodes similar to floating electrodes 212. It is appreciated that electrodes 222 may form an outer ring with respect to the floating electrodes 212. However, it is appreciated that the electrodes 222 may not necessarily form a ring structure and describing the electrodes 222 as a ring structure is for illustrative purposes only and not intended to limit the scope. For example, electrodes 222 may form a rectangular shape, a square shape, elliptical shape, randomly positioned, etc.

Figure 3:
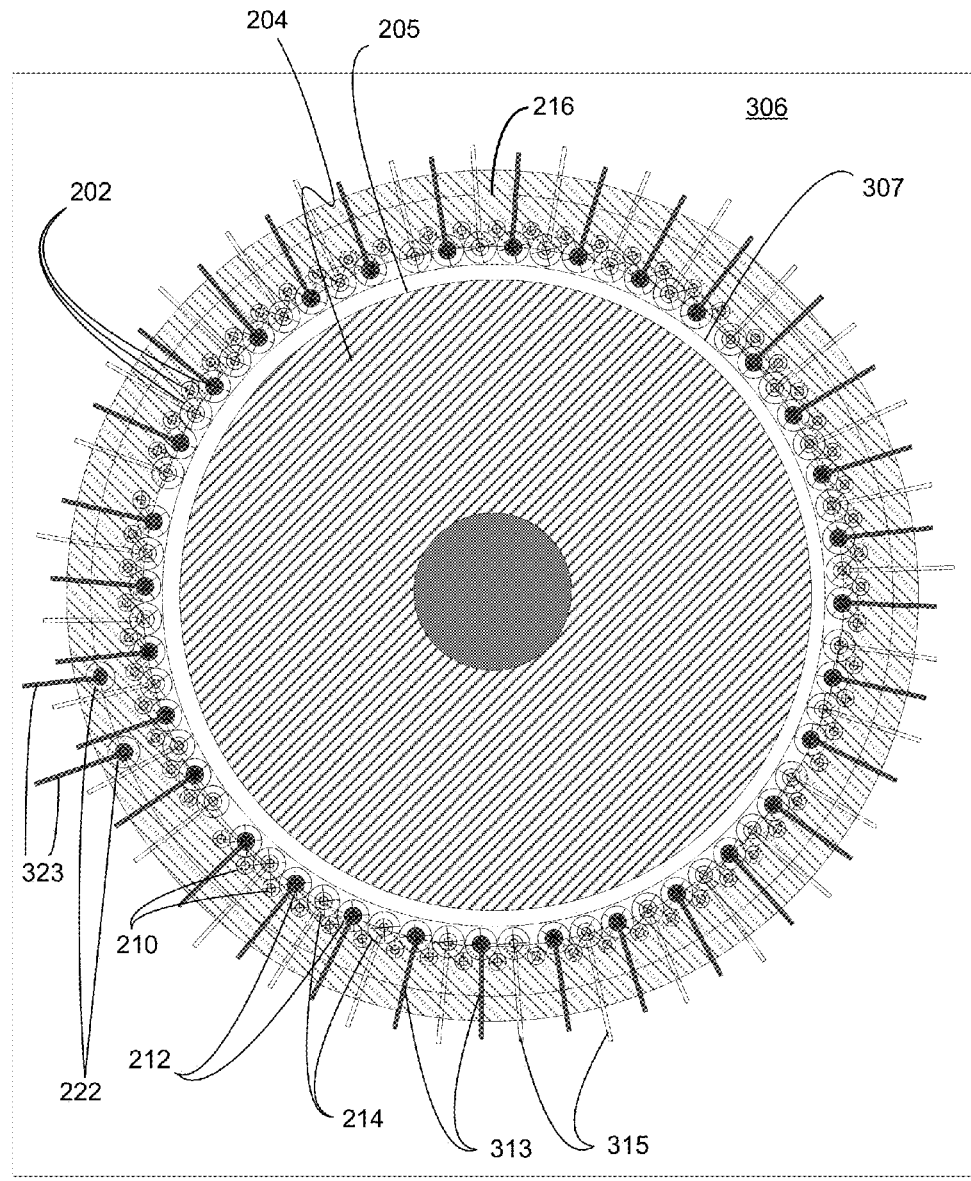
FIG. 3 is a plan view of sensor elements for measuring displacement and ambient noise according to one embodiment.

In some embodiments, the rotating disk 204 may be radially surrounded or framed by the electrodes 202 and 222. In various embodiments, the electrodes 202 and 222 may be formed by or inside vias located inside a printed circuit board (PCB) that radially surrounds the disk 204 (FIG. 3). The vias may be used as biasing, floating, or sensing electrodes. The PCB may include one or more layers. For example, each via may include six pads 208 that correspond to a six PCB layers. It is, however, appreciated that six pads 208 may correspond to a five layer PCB and that discussion of embodiments with respect to a six layer PCB is exemplary and not intended to limit the scope. It is further appreciated that a PCB with less than five layers or more than six layers may be used.

It is appreciated that the floating electrodes 212 along with the biasing electrodes 214 and the grounding electrodes 210 are used to measure the disk 204 displacement. In contrast, the electrodes 222 may be used in conjunction with the grounding electrodes 210 to measure the ambient noise.

Referring now to FIG. 2B, system 200B is shown in accordance with one embodiment. System 200B is substantially similar to that of FIG. 2A. However, in system 200B additional grounding electrodes 220 are formed on an outer periphery of the floating electrodes 212 and the grounding electrodes 210. It is appreciated that the grounding electrodes 220 are used in conjunction with electrodes 222 in order to measure the ambient noise rather than using the grounding electrodes 210.

Referring now to FIG. 3, a plan view of sensor elements for measuring displacement measurement and ambient noise according to one embodiment is shown. In an embodiment, the rotating disk 204 may be radially surrounded by a PCB 306. Electrodes 202 and 222 are positioned on the PCB 306. It is appreciated that the use of PCB 306 is for illustrative purposes and not intended to limit the scope of the embodiments. Furthermore it is appreciated that the electrodes 202 and 222 may be formed by or inside vias but are not limited thereto. The rotating disk 204 includes an outer edge 205 and the PCB 306 includes an inner edge 307 that is concentric with and larger than the outer edge 205 of the disk 204.

While FIG. 3 labels only one set of electrodes 202 that includes floating electrodes 212, biasing electrodes 214, and grounding electrodes 210, it can be appreciated that the three displacement sensor elements may be a subset of a larger number of electrodes 202 as illustrated in FIG. 3. For example, the electrodes 202 may include the electrodes 210, 212, and 214. Similarly, while only two electrodes 222 are shown for measuring ambient noise, it is appreciated that many more than two electrodes 222 may be used (not shown).

The electrodes 202 of FIG. 3 correspond to the electrodes 202 of FIGS. 2A-2B and the electrodes 222 of FIG. 3 correspond to the electrodes 222 of FIGS. 2A-2B. For example, as shown in FIGS. 2A-2B, an outer ring of electrodes 222 in FIG. 3 surround the rings formed by the grounding electrodes 210, floating electrodes 212, and biasing electrodes 214. Furthermore, the grounding electrodes 210 form an outer ring with respect to the floating electrodes 212 and the biasing electrodes 214 of FIG. 3 that are arranged in an alternating fashion. It is appreciated that the electrodes 202 and 222 surround the rotating disk 204.

In one embodiment, there may be an even number of floating electrodes 212 and an even number of biasing electrodes 214. In various embodiments, the number of floating electrodes 212 may be equal to the number of biasing electrodes 214. For example, the electrodes 202 may include 32 floating electrodes 212 and 32 biasing electrodes 214. In some embodiments, the total number of floating electrodes 212 and biasing electrodes 214 may be equal to the number of grounding electrodes 210. For example, the displacement sensor elements may include 64 grounding electrodes 210 and 64 total floating electrodes 212 and biasing electrodes 214. It is appreciated that the number of electrodes 222 may vary. In one instance the number of electrodes 222 is equal to the number of floating electrodes 212 whereas in other embodiments the number of electrodes 222 is twice the number of floating electrodes 212. It is appreciated that the number of electrodes 222 may have no correlation to the number of floating electrodes 212.

Floating traces 313 may couple the floating electrodes 212 to sensing circuitry (not shown), while biasing traces 315 may couple biasing electrodes 214 to biasing circuitry (not shown). The sensing circuitry may be used to measure the voltage level of the floating electrodes 212 while the biasing circuitry may set the voltage levels of the biasing electrodes 214, thereby measuring the displacement of the disk 204. In contrast, traces 323 may couple electrodes 222 to a sensing circuitry (not shown) in order to measure the ambient noise. Functionality and operation of the sensing circuitry mentioned herein is described fully in FIGS. 5A and 5B below.

Figure 4A:
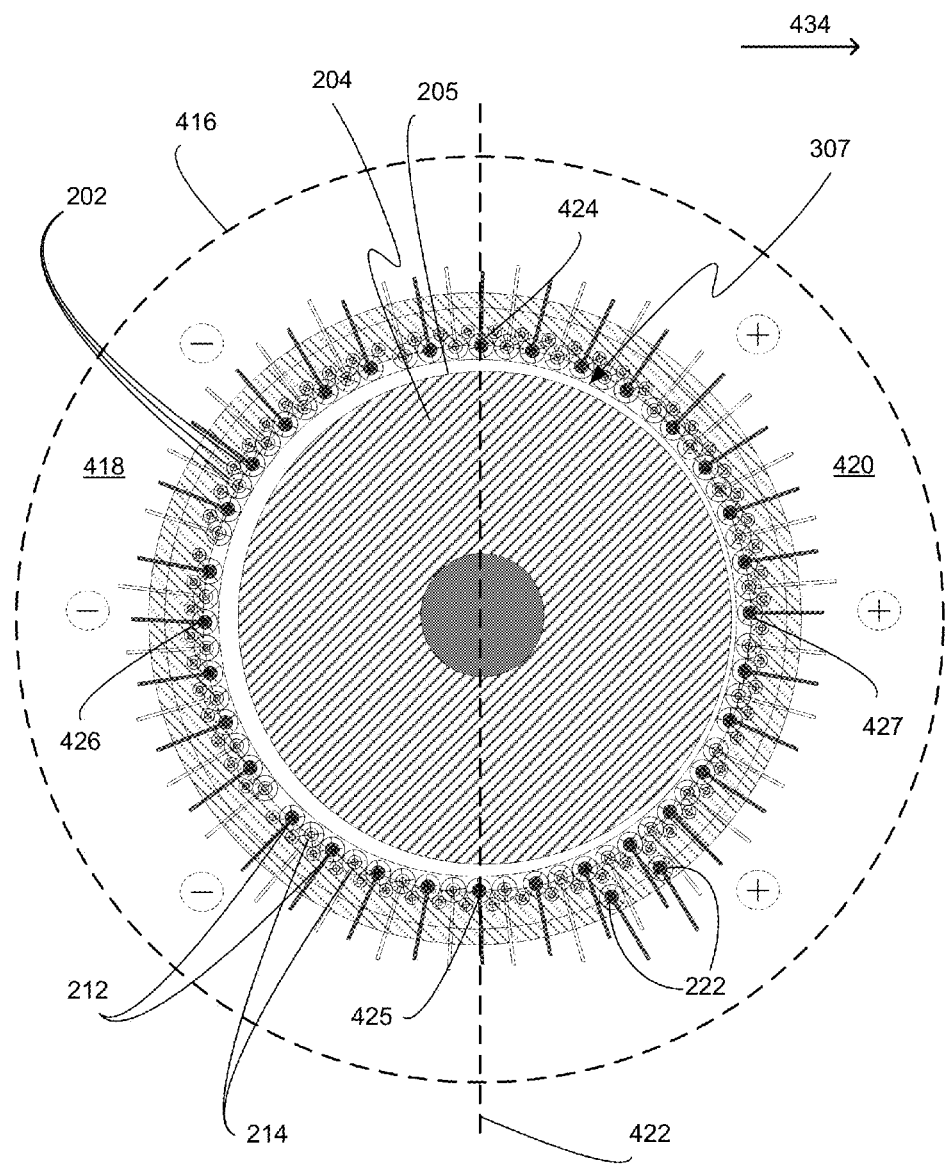
FIG. 4A depicts an electric field created by displacement sensors for measuring displacement and ambient noise according to an embodiment.

Referring now to FIG. 4A, an electric field created by displacement sensors for measuring displacement and ambient noise according to an embodiment is shown. According to one embodiment, electrodes 214 create an electric field 416. The ring of biasing electrodes 214 is divided into two circular halves where half of the biasing electrodes 214 are biased with a negative voltage while the other half of the biasing electrodes 214 are biased with a positive voltage. As a result, an electric field is created with a negatively-charged region 418 and a positively-charged region 420. A meridian line 422 depicts the interface between the negatively-charged region 418 and the positively-charged region 420.

If the disk 204 is centered with respect to the inner edge 307 of the PCB 306 (FIG. 3), the floating electrodes 424 and 425 that fall on the meridian line 422 may measure a net potential equal to zero since such electrodes are positioned between two fields of equal strength, namely the negatively-charged region 418 and positively-charged region 420. At the same time, the floating electrodes 426 and 427 that are positioned farthest from the meridian line 422 may measure a net potential equal to $-V_{center}$ and $+V_{center}$, respectively, since such electrodes are positioned within one side of the electric field 416 and far away from the opposite side of the electric field 416.

However, if the disk 204 is displaced from a center position such that the distance between the outer edge 205 of the disk 204 and the inner edge 307 of the PCB 306 (FIG. 3) is not constant at all points around the circular edges, the floating electrodes 424, 425, 426, and 427, may contemporaneously measure voltages that are different from the voltages measured when the disk 204 is centered.

For example, the disk 204 may be displaced in the direction 434. The floating electrodes 212 may measure a difference in voltage since the displacement 434 of the disk affects the strength of the electric field 416 at the location of each of the floating electrodes 212. More specifically, the dielectric properties of the disk's 204 material will be different from the dielectric properties of the matter that exists between the outer edge 205 of the disk 204 and the inner edge 307 of the PCB. As the disk 204 nears or evacuates an area, the area's dielectric properties will change, which in turn will affect the strength and coverage of the electric field 416.

Since the displacement of the disk 204 is in a direction 434 that is lateral to and not directly toward either of the floating electrodes 424 and 425, those electrodes will measure only a slight change in the strength of the electric field 416 in their location. However, the floating electrodes 426 and 427 that are located farthest from the meridian line 422 will not only measure a net potential different from $-V_{center}$ and $+V_{center}$, respectively, but the difference measured will be larger than the difference measured by the floating electrodes 424 and 425.

Thus, the disk 204 has moved away from floating electrode 426 and closer to floating electrode 427, thereby increasing the distance between the outer edge 205 of the disk 204 and the inner edge 307 of the PCB 306 (FIG. 3) at the point nearest floating electrode 426, and at the same time decreasing the distance between the outer edge 205 of the disk 204 and the inner edge 307 of the PCB 306 (FIG. 3) at the point nearest floating electrode 427. As a result of the displacement, the fraction of the potential $-V_{center}$ or voltage (e.g., electric charge) measured by floating electrode 426 may be less than the fraction of the potential $+V_{center}$ or voltage measured by the floating electrode 427.

Since the disk 204 has moved in a direction directly away from floating electrode 426 and directly toward floating electrode 427, the change in the amount of voltage that may be measured by floating electrodes 426 and 427 will be greater than the change measured by floating electrodes 424 and 425.

By measuring the change in voltage (e.g., electric charge) of the floating electrodes, the amount of disk displacement may be determined. For instance, in the orientation of the electric field 416, the voltage measurements of the floating electrodes 426 and 427 may be used to determine the displacement of the disk 204. Based on the amplitude and polarity of the measurement, the amount and direction of disk displacement may be determined. For example, the larger the voltage measurement sampled by the floating electrodes, the more the disk has displaced.

In various embodiments, the voltage (e.g., electric charge) measured by a subset of the floating electrodes 212 may be used to determine the strength of the electric field 416. For example, the floating electrodes that are farthest from the meridian line 422 may be used. For instance, in the orientation of the electric field 416 depicted in FIG. 4A, the voltage measurements of floating electrodes 426 and 427 may be used. In other embodiments, the floating electrodes 212 are electrically coupled so that the measurement of every floating electrode 212 will contribute to a net measurement of the electric field 416. The change in the amount of voltage that is measured will vary depending on the amount of disk displacement.

It is appreciated that the measured voltage includes ambient noise resulting from circuitries, florescent light, electrical noise, etc., or any combination thereof. Accordingly, ambient noise may be removed from the measured voltage after it is determined. In this embodiment, electrodes 222 are formed on an outer periphery of the disk 204 that are positioned further away in comparison to the floating electrodes 212, 427, 425, 424, and 426. Electrodes 222 may be floating electrodes in one embodiment.

The signal detected by the electrodes 222 is not modulated by the rotating disk 204, its displacement, and the electrical field created by the biasing electrodes 214 because electrodes 222 are further away from the rotating disk 204 in comparison to the floating electrodes 212, 427, 425, 424, and 426. Accordingly, the signal detected by electrodes 222 primarily comprises ambient noise rather than the voltage associated with the created electric field and the rotating disk 204, as measured by the floating electrodes 212, 427, 425, 424, and 426 that are associated with the disk displacement. In other words, the floating electrodes 212, 427, 425, 424, and 426 form a capacitance with the rotating disk 204 and the created electric field, thereby measuring displacement whereas capacitance formed between electrodes 222 and the rotating disk 204 with the created electric field is very weak, if any, in comparison, thereby measuring the ambient noise. It is appreciated that FIGS. 4B-4E may similarly use electrodes 222, as discussed with respect to FIG. 4A, to measure ambient noise but are not shown in FIGS. 4B-4E in order to avoid unnecessarily obscuring the embodiments of FIGS. 4B-4E.

Figure 4B:
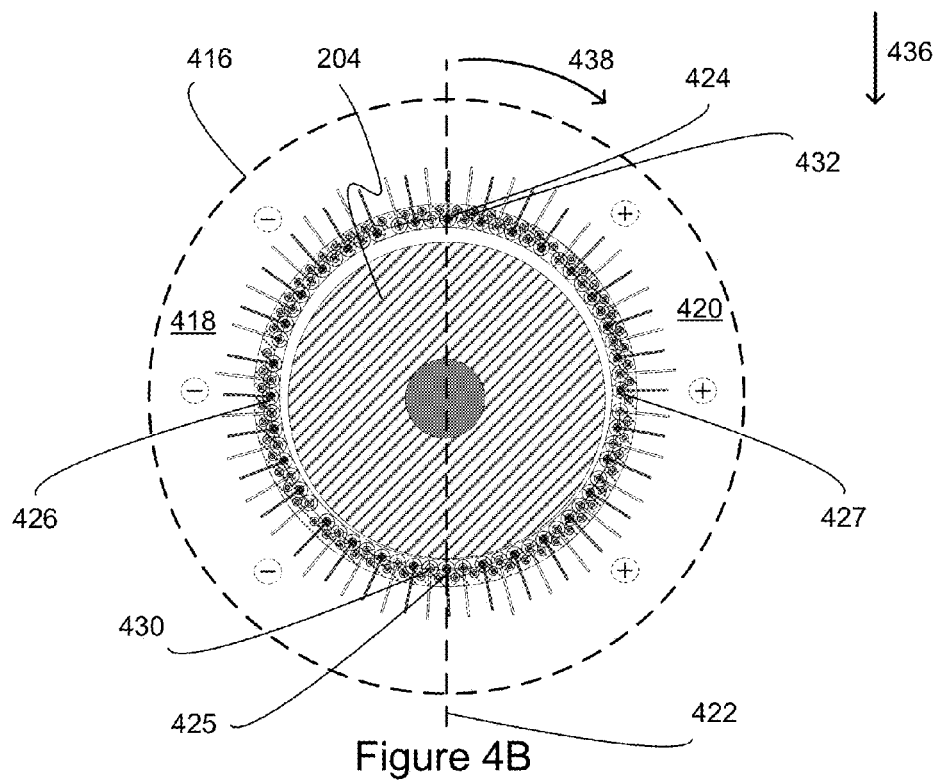
FIGS. 4B-4E depict the rotation of an electric field created by displacement sensors according to some embodiments.

FIG. 4B depicts the rotation 438 of an electric field 416 created by displacement sensors, according to an embodiment. Similar to the electric field 416 of FIG. 4A, the biasing electrodes located to the left of the meridian line 422 are biased to a negative voltage, thereby creating the negatively-charged region 418. Accordingly, biasing electrode 430 that is positioned within the negatively-charged region 418 is biased to a negative voltage.

Similarly, the biasing electrodes located to the right of the meridian line 422 are biased to a positive voltage, thereby creating the positively-charged region 420. Accordingly, biasing electrode 432 that is positioned within the positively-charged region 420 is biased to a positive voltage. The difference in voltage between the biasing electrodes positioned within the negatively-charged region 418 and positively-charged region 420 creates the electric field 416 in an initial orientation of the electric field 416.

Unlike FIG. 4A, if the disk 204 moves away from floating electrode 424 and toward floating electrode 425 in a downward direction 436, the electric field at floating electrodes 426 and 427 may be only slightly affected since the movement of the disk 204 would be lateral to those electrodes. As a result, floating electrodes 426 and 427 may measure only a slight change of the fraction of the potential difference between $+V_{center}$ and $-V_{center}$.

At the same time, floating electrodes 424 and 425 may also measure only a slight change in voltage since half of the disk 204 is still in the negatively-charged region 418 and the other half of the disk 204 is still in the positively-charged region 420. Accordingly, the measurement of changes in the electric field 416 on the floating electrodes 212 may be less when the disk 204 moves in a direction along the meridian line 422 of the electric field 416. Therefore in order to increase the change in potential measured by the electrodes, the orientation of the electric field 416 may be adjusted such that it rotates in the direction indicated by the arrow 438.

Figure 4C:
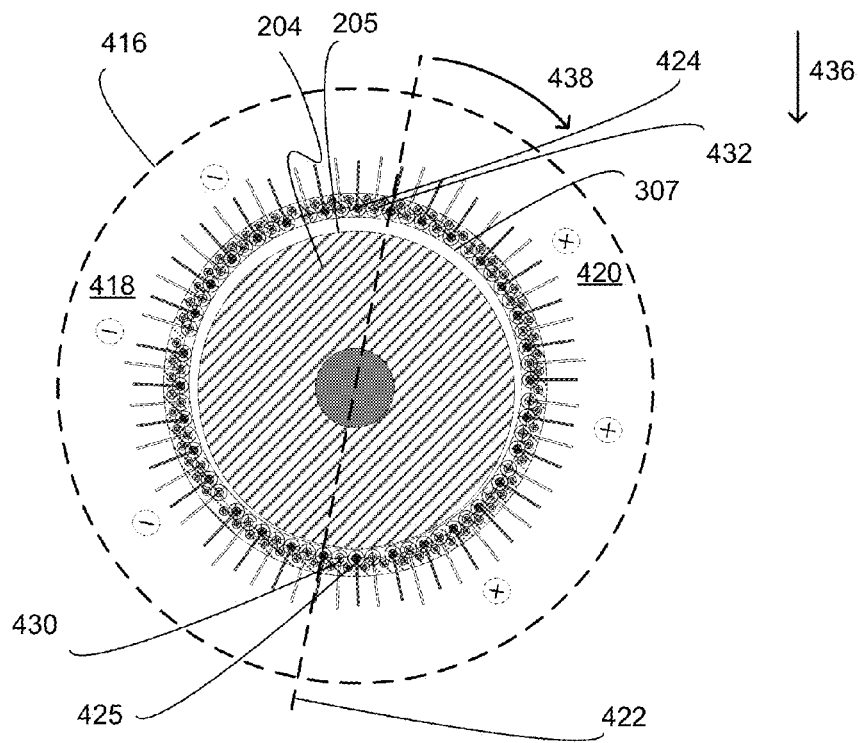

FIG. 4C depicts the rapid rotation 438 of an electric field 416 created by displacement sensors, according to an embodiment. Similar to the electric field 416 of FIG. 4A, the biasing electrodes positioned to the left of the meridian line 422 and within the negatively-charged region 418 are biased to a negative voltage. At the same time, the biasing electrodes positioned to the right of the meridian line 422 and within the positively-charged region 420 are biased to a positive voltage.

However, the driving protocol arrangement of negatively and positively biased biasing electrodes causes the electric field 416 to rotate in a clockwise manner. More specifically, biasing electrode 430, which was originally biased to a negative voltage, may be now biased to a positive voltage. Similarly, biasing electrode 432, which was originally biased to a positive voltage, may be now biased to a negative voltage. Meanwhile, the voltage of all of the other biasing electrodes may be maintained.

As a result of the new driving state of negatively and positively biased biasing electrodes, the electric field 416 rotates, e.g. in a clockwise manner. As the electric field 416 rotates, the weakest areas of electric field measurement, e.g. near the meridian line 422, rotate away from the areas where the outer edge 205 of the disk 204 is nearest or farthest from the inner edge 307 of the PCB 306. Correspondingly, the strongest areas of electric field measurement, e.g. the areas on the ring of electrodes farthest from the meridian line 422, rotate toward the areas where the outer edge 205 of the disk is nearest or farthest from the inner edge 307 of the PCB 306. As a result, the floating electrodes that may have been positioned in the weakest areas of electric field measurement may eventually be positioned in the strongest area of electric field measurement, which in turn increases the floating electrodes' measurement of the changes in the electric field 416 caused by the displacement 436.

For example, the floating electrodes 424 and 425 in FIG. 4B were least sensitive to the changes in the electric field 416 caused by the displacement 436 since they were positioned on the meridian line 422, where electric field measurement may be weakest. However, as the electric field 416 rotates in the direction indicated by the arrow 438, the floating electrodes 424 and 425 become more sensitive to the changes in the electric field 416 caused by the displacement of the disk 436 since the effect of the displacement 436 on the strength of electric field measurement is increased when the floating electrodes 424 and 425 are positioned in the strongest areas of electric field measurement.

As a result of the rotation of the electric field 416, the floating electrodes that are best positioned to measure changes in the electric field 416 due to the disk displacement will eventually be located in the strongest areas of electric field measurement. Once the strength of the electric field 416 in each rotational position is known, both the amount and direction of the disk displacement may be determined.

Figure 4D:
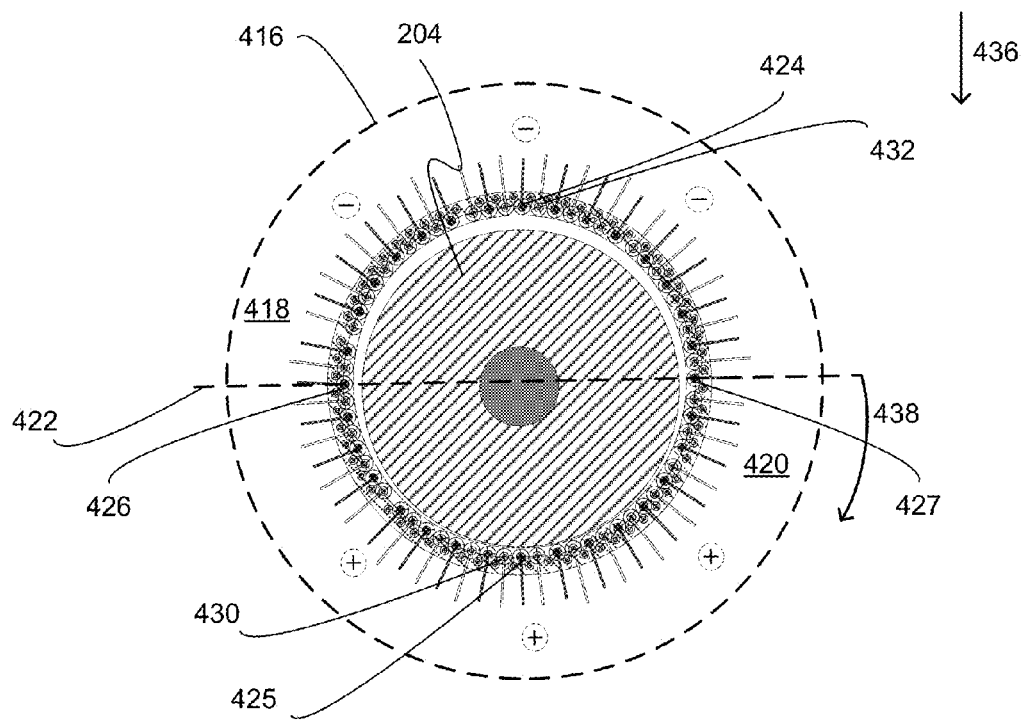

FIG. 4D depicts the rotation 438 of an electric field 416 created by displacement sensors, according to an embodiment. The electric field 416 of FIGS. 4A-4C may be caused to continue to rotate when the biasing of the biasing electrodes that are immediately adjacent to the direction of the meridian line's rotation are changed from positive to negative and from negative to positive in the fashion described above with reference to FIG. 4C. The electric field 416 depicted in FIG. 4D has completed a quarter-rotation through this manner.

Like FIGS. 4B-4C, the disk 204 is displaced from a center position since it has moved away from floating electrode 424 and toward floating electrode 425 in the direction 436. Unlike FIGS. 4B-4C, the floating electrodes 424 and 425 in FIG. 4D are positioned where electric field measurement may be strongest. As a result, floating electrodes 424 and 425 are most sensitive to changes in the electric field 416 caused by the displacement 436.

Since the floating electrodes 424 and 425 measure the largest amount of change in the electric field 416 in comparison to all of the other floating electrodes in every other rotational position of the electric field 416, it can be determined that the disk 204 has displaced in the displacement direction 436. In addition, the amplitude of the change in the electric field 416 may be used to determine the amount of disk displacement in the displacement direction 436. In this way, the direction and amplitude of the disk's 204 displacement in any direction may be determined by rotating the electric field 416 360 degrees and determining at which position the measured change of the electric field 416 is greatest.

Figure 4E:
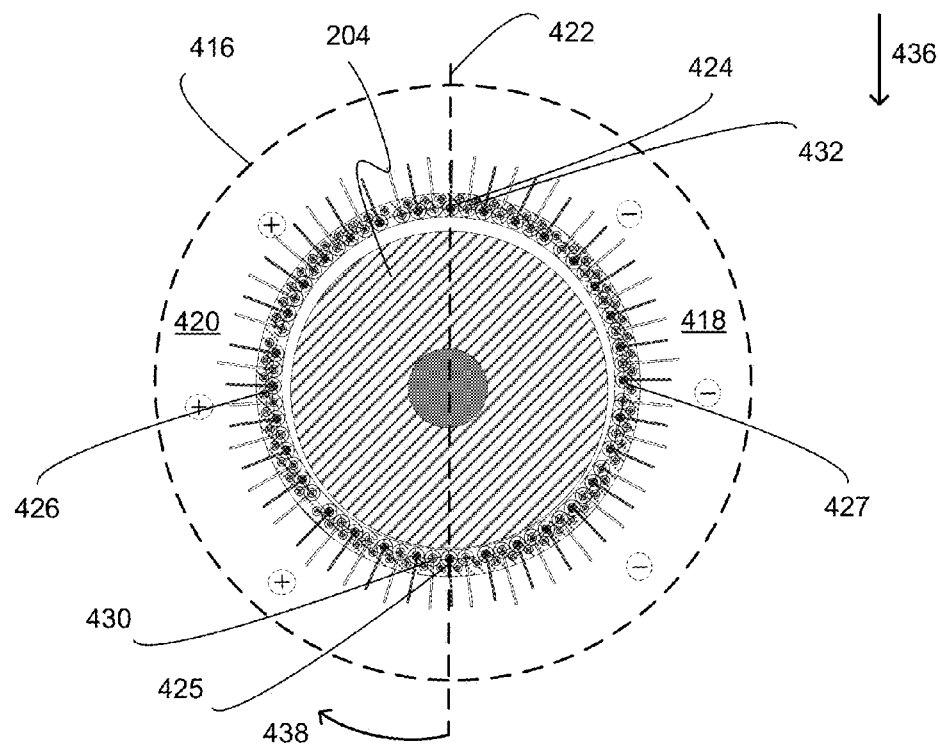

FIG. 4E depicts the rotation 438 of an electric field 416 created by displacement sensors, according to an embodiment. The electric field 416 in FIG. 4E has rotated 180 degrees in comparison to its position in FIG. 4A. Once the electric field 416 has completed such a half-rotation, the measurements made by the floating electrodes may be sufficient to determine the displacement of the disk 204. For example, not only may have the floating electrodes forming the half-ring below floating electrodes 426 and 427 taken measurements, but the floating electrodes forming the half-ring above floating electrodes 426 and 427 may have taken measurements as well. As a result, the displacement 436 of the disk may have been measured by all 32 floating electrodes positioned around the disk 204.

As the biasing electrodes continue to change in their biasing arrangement, the electric field 416 will eventually complete a full rotation. Accordingly, biasing electrodes 430 and 432 will once again be biased to negative and positive potentials, respectively. After one full rotation of the electric field 416, the floating electrodes 212 will have made 32 measurements. Using the 32 measurements, the displacement of the disk may be determined. However, embodiments as described herein can be applied where there are more or less floating electrodes and biasing electrodes, resulting in more or less displacement measurements per each electric field rotation. For example, to increase the accuracy of the displacement measurement, 64 floating electrodes and 64 biasing electrodes may be used to produce 64 measurements.

Conversely, when less accuracy is sufficient, 16 floating electrodes and 16 biasing electrodes may be used to produce 16 measurements. Even as few as 4 floating electrodes and 4 biasing electrodes, located above, below, to the right, and to the left of the disk, may be used to produce a rotating field that has 4 electric field rotational positions that may be used to measure the displacement of the disk. Even further, in such a configuration, the field may be rotated to only 2 positions. For example, the field may be rotated once to the orientation depicted in FIG. 4B and once to the orientation depicted in FIG. 4D. Since the floating electrodes may measure the X and Y displacement components of the disk, the overall displacement of the disk in any direction of the 2-dimensional radial plane may be determined.

In various embodiments, not all possible positions of the electric field may be used. For example, if there are 32 biasing electrodes, only 16 of the biasing electrodes may be used, resulting in only 16 electric field positions. As discussed above, even as few as 4 floating electrodes and 4 biasing electrodes may be sufficient to measure the displacement of the disk in some embodiments. Accordingly, even where there are 32 floating electrodes and 32 biasing electrodes, only 4 floating electrodes and 4 biasing electrodes may be used to measure the displacement of the disk.

In some embodiments, the biasing electrodes may be grouped. For example, the biasing electrodes may be "doubled-up" so that each time the biasing electrode configuration is changed, two biasing electrodes are changed to a positive potential and two biasing electrodes are changed to a negative potential. As a result, if there are 32 biasing electrodes, there will be 16 electric field positions.

While embodiments have been discussed with the number of floating electrodes being equal to the number of biasing electrodes, there may be more or less floating electrodes than biasing electrodes. For example, while there may be 32 floating electrodes, 64 biasing electrodes may provide 64 electric field rotational positions. Conversely, while there may be 32 biasing electrodes, 64 floating electrodes may provide higher-resolution measurements of the electric field. In some embodiments, the size of the floating electrodes may differ from the size of the biasing electrodes, such that larger biasing electrodes would result in a stronger electric field or larger floating electrodes would result in increased sensitivity to the electric field.

Embodiments as described herein can be applied where the rotation of the electric field 416 is either in a clockwise or counterclockwise direction. In further embodiments, the rotation of the electric field 416 may be either in the same or opposite direction as the rotation of the disk 204. In various embodiments, the electric field 416 may complete multiple rotations in the time that disk 204 completes a single rotation.

Referring now to FIG. 5A, a plan view of floating rings and sensing rings according to some embodiments is shown. In this embodiment a first floating ring 516 may couple some or all of the floating electrodes 212. The floating electrodes 212 may be used with sensing rings 514 and 518 to measure displacement of the disk 204. It is appreciated that a second floating ring 520 may couple some or all of the electrodes 222. The electrodes 222 may be used with sensing rings 524 and 528 to measure ambient noise according to some embodiments. The sensing rings 514, 518, the first floating ring 516, and the floating electrodes 212 may be coupled to a sensing circuit (shown in FIGS. 6A-6B) to measure displacement of the disk 204. It is appreciated that the sensing rings 524, 528, the second floating ring 520, and the electrodes 222 may be coupled to a sensing circuit (shown in FIGS. 6A-6B) to measure ambient noise. It is appreciated that in this embodiment at least one electrode 222 is shown to be positioned outside of the sensing rings 524 and 528 to illustrate that electrodes 222 may not necessarily form a ring structure as long as the electrodes 222 are positioned further away from the rotating disk 204 in comparison to the floating electrodes 212.

PCB 306 may include multiple layers, e.g., five layers, six layers, etc. In this embodiment, the PCB 306 may include 5 layers. The top layer (referred to herein as the first layer) may include the biasing traces 315 that couple the biasing electrodes 214 to the biasing circuitry (not shown) to create electric fields around the rotating disk 204. A second layer below the first layer may include the sensing rings 514, 524 (see FIGS. 5B-5C) and a grounding plane 511. The grounding plane 511 may insulate the floating electrodes 212, electrodes 222, floating traces 313, traces 323, the first floating ring 516, the second floating ring 520, and sensing rings 514, 518, 524, and 528 from each other and from the biasing traces 315 such that the voltage or charge transfer due to the movement of the disk is measured accurately without interference from the biasing electrodes 214 or other components. The grounding plane 511 may exist on all layers of the PCB 306.

A third layer below the second layer may include the floating traces 313 that couple some or all of the floating electrodes 212 with the first floating ring 516 (see FIG. 5B). It is appreciated that the third layer may also include the traces 323 that couple some or all of the electrodes 222 with the second floating ring 520 (see FIG. 5C). Accordingly, some or all of the floating electrodes 212 may be coupled with each other through the floating traces 313 and some or all of the electrodes 222 may be coupled with each other through traces 323. The floating electrodes 212, coupled through the floating traces 313 and the first floating ring 516, are further coupled to the sensing circuit (shown in FIGS. 6A-6B) for determining displacement of the disk 204. The electrodes 222, coupled through the traces 323 and the second floating ring 520, are further coupled to the sensing circuit (shown in FIGS. 6A-6B) for measuring ambient noise.

A fourth layer below the third layer may include the sensing rings 518 and 528 (see FIGS. 5B-5C) and another grounding plane 511. Finally, a fifth layer below the fourth layer may include a grounding plane 511. It is appreciated the configuration as described above having certain components on the same layer is illustrative and not intended to limit the scope of the embodiments. For example, the sensing rings 514 and 524 may be positioned on different layers rather than on the same layer. Similarly, sensing rings 518 and 528 may be positioned on different layers rather than on the same layer. Furthermore, the floating electrodes 212, floating traces 313, and the first floating ring 516 may be on a different layer of the PCB than electrodes 222, traces 323 and the second floating ring 520.

Referring now to FIG. 5B, the first floating ring 516 is positioned in the third layer of the PCB 306, disposed between the sensing rings 514 and 518. Referring now to FIG. 5C, the second floating ring 520 is positioned in the third layer of the PCB 306, disposed between the sensing rings 524 and 528.

Returning to FIG. 5A, the floating traces 313 on the third layer extend from the floating electrodes 212 to points that are either directly between the sensing rings 514 and 518 or to points that are radially passed the sensing rings 514 and 518. Accordingly, the floating traces 313 are disposed between two plates of a capacitor formed by the first and second sensing rings 514 and 518. As a result, the sensing rings 514 and 518 may be used to measure the changes in potential or charge transfers on the floating electrodes 212. The charge transfer occurs as an electrode switches from one potential to another, as discussed below. The net electric charge transferred is the product of the capacitor between a floating electrode and a biasing electrode, times the difference in potential resulting from switching of those electrodes.

According to one embodiment, the traces 323 on the third layer extend from the electrodes 222 to points that are either directly between the sensing rings 524 and 528 or to points that are radially passed the sensing rings 524 and 528. Accordingly, the traces 323 are disposed between two plates of a capacitor formed by the sensing rings 524 and 528. As a result, the sensing rings 524 and 528 may be used to measure the changes in potential or charge transfers on the electrodes 222. The measured potential or charge transfer represents the ambient noise.

It is appreciated that embodiments described herein may be applied where the interface between the floating and biasing electrodes is coupled to circuitry through other means. For example, the floating and sensing rings may not be used, but instead, the floating traces may couple directly with sensing circuitry (not shown). Further, embodiments described herein may be applied where the PCB includes more or fewer layers. For example, a PCB with 20 layers may be used.

Figure 6A:
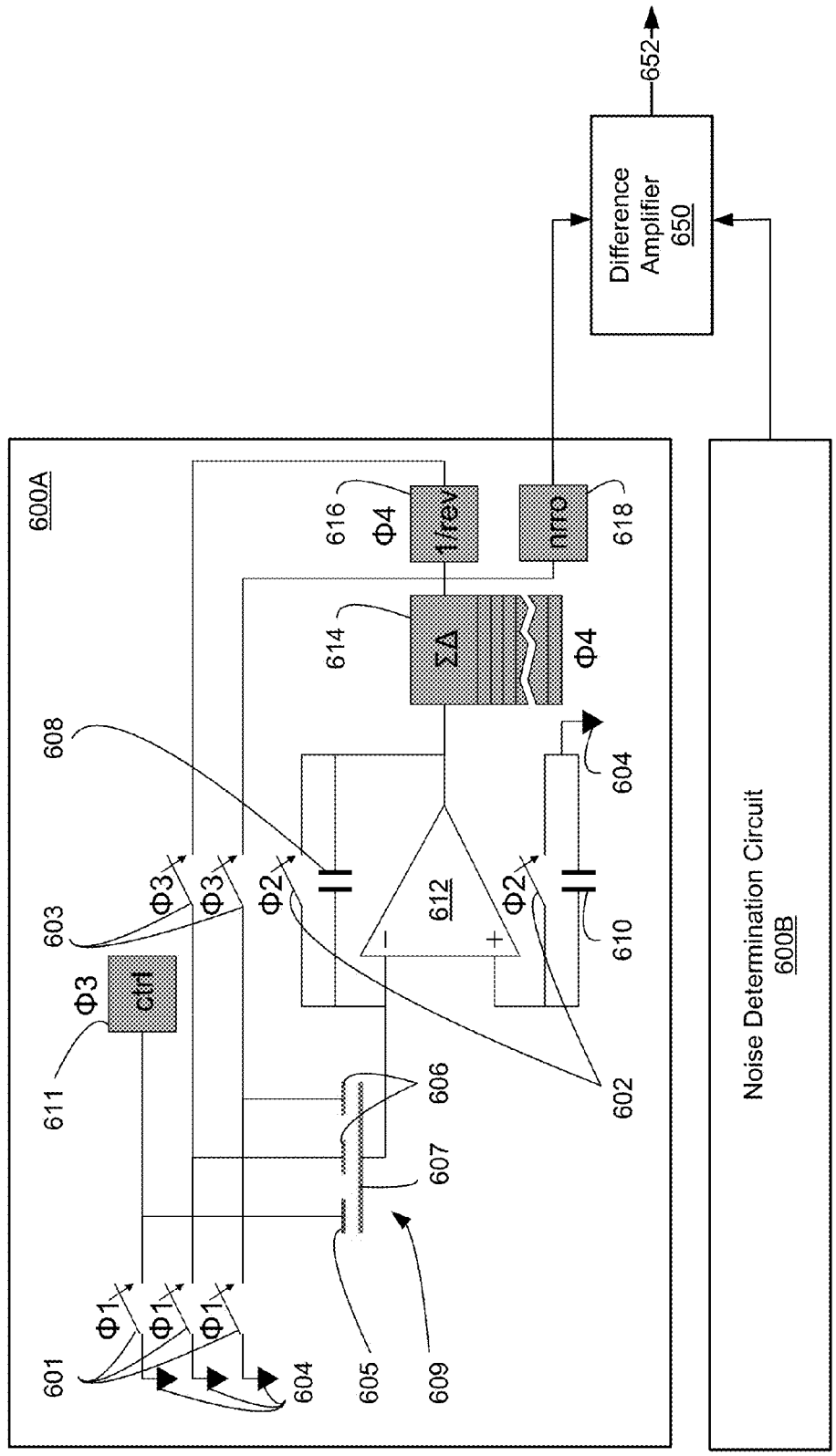
FIGS. 6A-6B are schematic diagrams of circuitry for measuring the displacement of a rotating disk and ambient noise according to some embodiments.

FIG. 6A is a schematic diagram of circuitry for measuring the displacement of a rotating disk and ambient noise according to some embodiments. FIG. 6A depicts a circuit 600A that may be used to determine the displacement of a rotating disk based on information provided by displacement sensors, according to an embodiment. Noise determination circuitry 600B is substantially similar to that of circuit 600A and is used to measure ambient noise. FIGS. 6C and 6D depict a circuit timing diagram for the circuit 600A of FIG. 6A that determines the displacement of the rotating disk based on the information provided by the displacement sensors, according to an embodiment. The schematic diagram of the circuit 600A in FIG. 6A will be discussed with reference to the circuit timing diagrams in FIGS. 6C and 6D.

FIGS. 6C and 6D show two full clock cycles 630 and 632 of a non-overlapping clock, where both cycles 630 and 632 follow the same timing pattern. For instance, clock signal φ4 may go high for each time labeled 'd' in both the clock cycles 630 and 632, clock signal φ2 may go high for each time labeled 'e' in both the clock cycles 630 and 632, and so on.

Circuit 600A includes electrical ground nodes 604 and switches 601, 602, and 603. When a clock signal goes high, the switches corresponding to that clock signal may close, i.e., shorting the connection. Conversely, when a clock signal goes low, the switches corresponding to that clock signal may open.

Circuit 600A also includes biasing electrodes 605 which may correspond to the biasing electrodes 214 of FIGS. 1-4 that are controlled by the controller 611. The sampling electrodes 606 may correspond to or may be coupled with the sensing rings 514 and 518 of FIGS. 1-4. The floating electrodes 607 may correspond to or may be coupled with the floating ring 516 of FIGS. 1-4. Accordingly, the capacitor 609 may correspond to the capacitor assembly formed between the sensing rings 514 and 518, the biasing electrodes 605, and the floating electrodes 607. Additional capacitive components between each of the sensing rings 514 and 518, the biasing electrodes 605, and the floating electrodes 607, are not shown for clarity of the figure.

In reference to FIG. 6C, one clock period may begin at time 'a' in clock cycle 630. At time 'a,' signal φ3 goes low causing the switches 603 to open. As a result, biasing electrodes 605 are caused to float. Approximately at the same time, signal φ4 goes low in preparation for its next rising edge. At time 'b,' signal φ2 goes low causing the switches 602 to open. Consequently, the capacitors 608 and 610 are caused to float, allowing the capacitors 608 and 610 to sample the next electric field charge created by the biasing electrodes 605 and altered by the displacement of an object within the electric field.

At time 'c,' signal φ1 goes high causing the switches 601 to close. As a result, biasing electrodes 605 and sampling electrodes 606 are shorted to the ground nodes 604. At the same time, the bias is set, which results in a charge transfer across the floating capacitors 609, which is sampled by the capacitors 608 and 610.

At time 'd,' signal φ4 goes high, causing a sigma-delta converter 614 to acquire the sign of the resulting charge on an integrator 612 for further processing. In various embodiments, the integrator 612 may be an operational transconductance amplifier with input and output terminals linked by capacitors 608 and 610. The integrator 612 may integrate a previously stored value in the sigma-delta converter 614 with a currently measured value and store the integrated value in the sigma-delta converter 614. At time 'e,' signal φ2 goes high, causing the switches 602 to close. Accordingly, the charge levels on the sample and hold capacitors 608 and 610 are reset as a result of the short.

At time 'f,' signal φ1 goes low, causing the switches 601 to open, and at time 'g,' signal φ3 goes high, causing the switches 603 to close. As a result, the biasing potentials on the biasing electrodes 605 and sampling electrodes 606 are set. At this time, the biasing electrodes 605 may be biased to rotate the electric field to the next electric field rotation.

When signal φ3 goes low once again at time 'a' in the next clock cycle 632, the switches 603 open. Accordingly, the biasing electrodes 605 float once again, which ends the previous clock cycle 630 and initiates the next clock cycle 632.

It should be appreciated that different timing diagrams may describe the operation of circuit 600A. For example, in reference to FIG. 6D, one clock period may begin at time 'a' in clock cycle 630. At time 'a,' signal φ2 goes low, causing the switches 602 to open. Consequently, the capacitors 608 and 610 are caused to float, allowing the capacitors 608 and 610 to sample the next electric field charge created by the biasing electrodes 605 and altered by the displacement of an object within the electric field. At time 'ID,' signal φ3 goes low causing the switches 603 to open. As a result, biasing electrodes 605 and sampling electrodes 606 are caused to float. Approximately at the same time, signal φ4 goes low in preparation for its next rising edge.

At time 'c,' signal φ1 goes high causing the switches 601 to close. As a result, biasing electrodes 605 and sampling electrodes 606 are shorted to the ground nodes 604. This shorting to ground changes the potential of the biasing electrodes 605 and sampling electrodes 606, which results in a charge transfer across the floating capacitors 609, which is sampled by the capacitors 608 and 610.

At time 'd,' signal φ4 goes high, causing a sigma-delta converter 614 to acquire the sign of the resulting charge on an integrator 612 for further processing. In various embodiments, the integrator 612 may be an operational transconductance amplifier with input and output terminals linked by capacitors 608 and 610. The integrator 612 may integrate a previously stored value in the sigma-delta converter 614 with a currently measured value and store the integrated value in the sigma-delta converter 614. At time 'e,' signal φ2 goes high, causing the switches 602 to close. Accordingly, the charge levels on the sample and hold capacitors 608 and 610 are reset as a result of the short.

At time 'f,' signal φ1 goes low, causing the switches 601 to open, and at time 'g,' signal φ3 goes high, causing the switches 603 to close. As a result, the biasing potentials on the biasing electrodes 605 and sampling electrodes 606 are set. At this time, the biasing electrodes 605 may be biased to rotate the electric field to the next electric field rotation.

When signal φ2 goes low once again at time 'a' in the next clock cycle 632, the switches 602 are caused to open. Accordingly, the capacitors 608 and 610 are caused to float once again, which ends the previous clock cycle 630 and initiates the next clock cycle 632.

In various embodiments, the circuit in FIG. 6A may be operated in accordance with a clock cycle of the timing diagrams in FIGS. 6C and 6D for each rotational position of the electric field. For example, 32 biasing electrodes 605 may create 32 electric field positions. For each electric field position, the circuit may complete one clock cycle. As a result, an electric field may be created for each of the 32 positions and the electric field may be sampled for each of the 32 positions.

In some embodiments, the sigma-delta converter 614 may include multiple registers to store a value corresponding to each position of the electric field. For example, if there are 32 electric field positions, the sigma-delta converter 614 may include 32 registers to store an electric field strength value that corresponds to each position. In various embodiments, when the electric field has completed one full revolution and begins a next revolution, the values in the sigma-delta converter may be overwritten by the average value of the previously stored measurement and the current measurement. As a result, the measurements of each position of an object may be oversampled.

According to one embodiment, elements 616 ad 618 may be referred to as a comb filter. In one illustrative example, the comb filter is configured to separate repetitive portion of the displacement signal associated with the rotating disk from the non-repetitive portion. Repetitive may refer to the successive revolutions of the mechanical rotation of the rotating disk. It is appreciated that the comb filter may include register where input values are accumulated over time. The pointer associated with the register is controlled by the angular position of the rotating disk. For example, 36 registers may be defined if the angular position of the rotating disk is known with a resolution of 10 degrees, which is equivalent to $\frac{1}{36}^{th}$ of a revolution.

In one embodiment, the output of element 616 is the scanned output of the registers and is therefore associated with repetitive mechanical runout of the rotating disk, as measured by the sensor circuitry. Element 618 is configured to determine the non-repetitive mechanical runout by measuring the difference between the total mechanical runout of the rotating disk, as measured by the sensor circuitry, and the repetitive mechanical runout, as determined by element 616.

According to one embodiment, the noise determination circuitry 600B operates in substantially the same manner as circuit 600A. However, the controller 611 and the biasing electrodes 605 may be eliminated from the noise determination circuitry 600B. As such, the electrodes 607 corresponding to the electrodes 222 in the noise determination circuit 600B measure ambient noise as opposed to a change in potential that corresponds to the displacement of the disk 204 in circuit 600A.

A difference amplifier 650 may be used to remove the measured ambient noise from the determined displacement of the disk 204. In other words, a signal 652 representing displacement of the disk 204 without ambient noise may be generated. It is appreciated that the use of difference amplifier 650 is illustrative and not intended to limit the scope of the embodiments. For example, a component other than the difference amplifier may be used to remove the measured ambient noise.

Figure 6B:
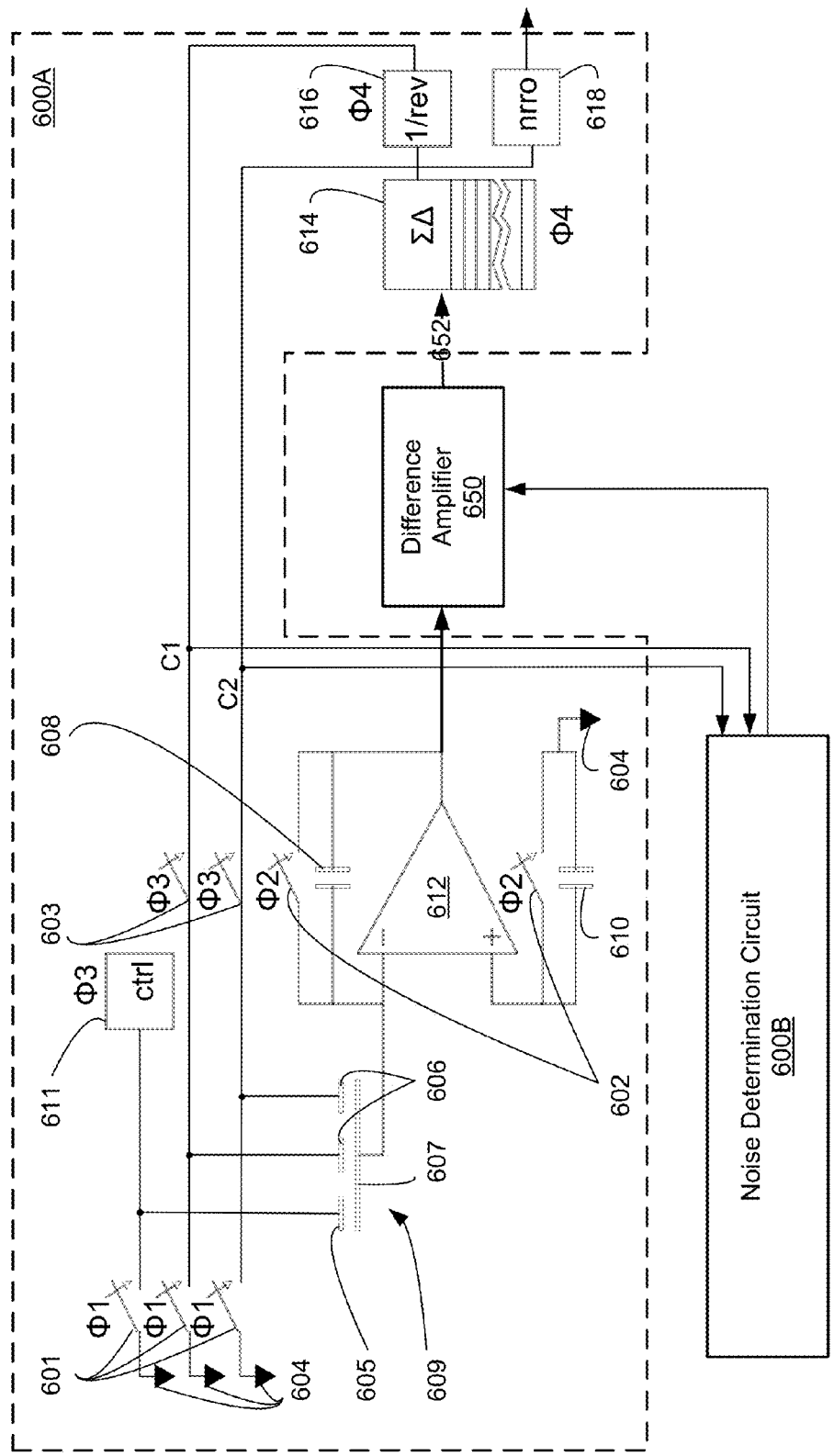
Figure 6C:
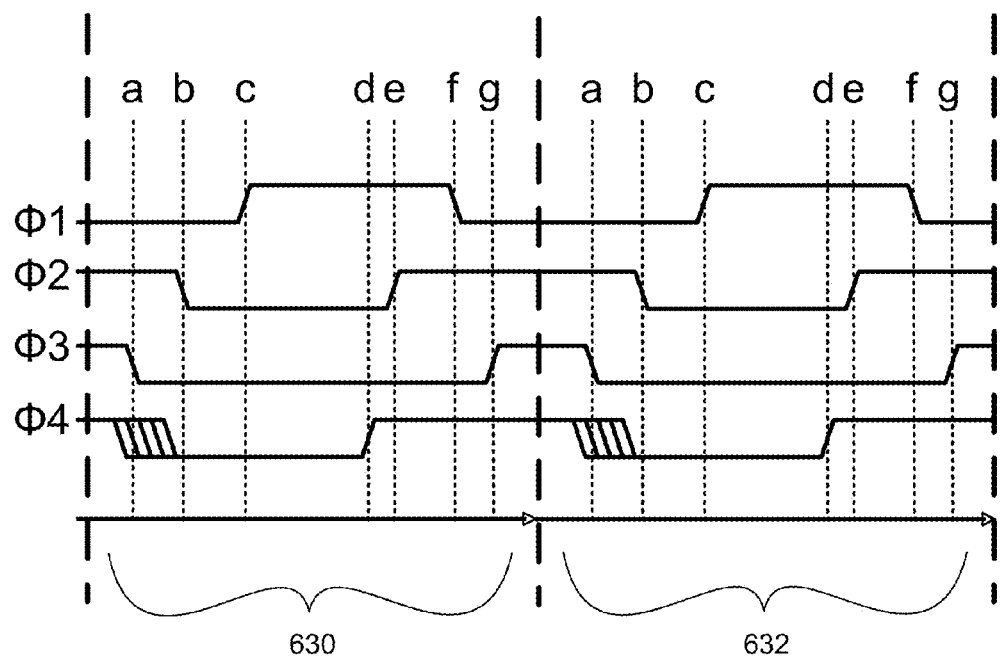
FIGS. 6C-6D depict a circuit timing diagram of circuitry that determines the displacement of a rotating disk according to an embodiment.
Figure 6D:
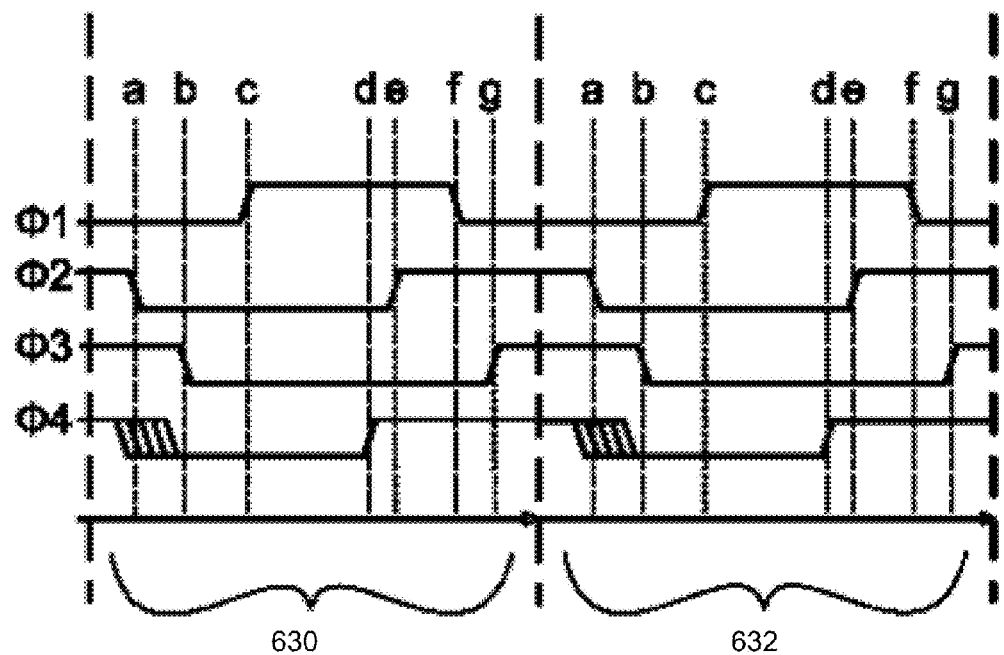

Referring now to FIG. 6B, a schematic diagram of circuitry for measuring the displacement of a rotating disk and ambient noise according to some embodiments is shown. It is appreciated that this embodiment operates substantially similar to that of FIG. 6A except that signals C1 and C2 are not generated by the noise determination circuit 600B but are rather received from circuit 600A.

Figure 7:
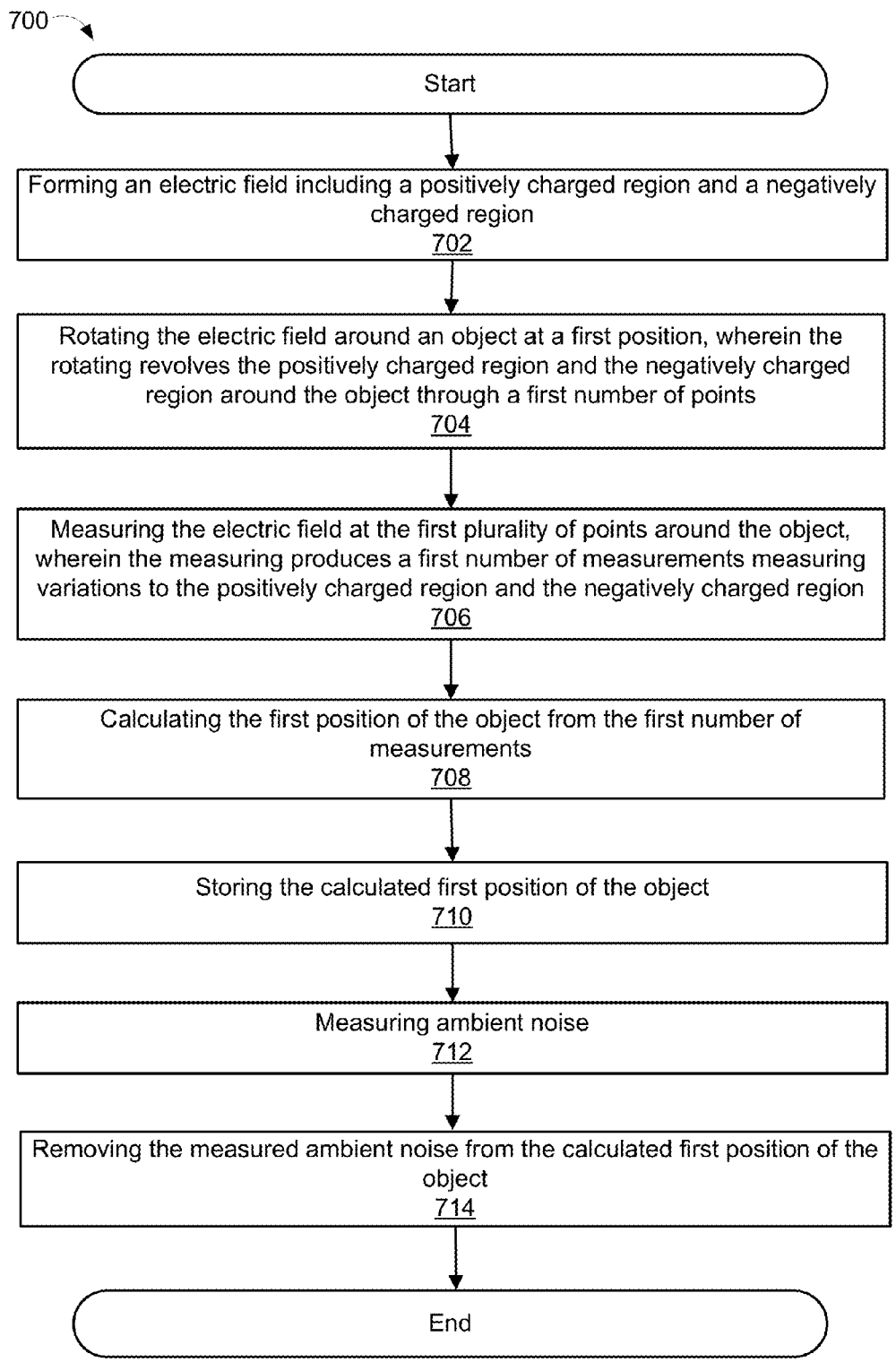
FIG. 7 depicts an exemplary flowchart for determining the displacement of an object and ambient noise according to an embodiment.

Referring now to FIG. 7, an exemplary flowchart 700 for determining the displacement of an object and measuring ambient noise in accordance with some embodiments is shown. In block 702, an electric field including a positively charged region and a negatively charged region is formed. For example, in FIG. 4A, an electric field including a positively charged region and a negatively charged region is formed.

In various embodiments, forming an electric field includes biasing a first half of a ring of a number of biasing electrodes to a positive voltage to form the positively charged region and biasing a second half of the ring of the number of biasing electrodes to a negative voltage to form the negatively charged region. For example, in FIG. 4A, an electric field is formed by biasing a first half of a ring of a number of biasing electrodes to a positive voltage to form the positively charged region and biasing a second half of the ring of the number of biasing electrodes to a negative voltage to form the negatively charged region.

In various embodiments, a first number of electrodes are disposed to form a first ring, and further operable to form the electric field around the object. For example, in FIG. 4A, a number of biasing electrodes are disposed to form a first ring including a first diameter, and further operable to form the electric field around the object. In further embodiments, a second number of electrodes are alternately disposed with the first number of electrodes within the first ring, and further operable to measure variations in the electric field attributed to a position of the object. For example, a number of floating electrodes are alternately disposed with the number of biasing electrodes within the first ring, and further operable to measure variations in the electric field.

In even further embodiments, a third number of electrodes are disposed to form a second ring and further electrically coupled with an electrical ground. For example, in FIG. 3, a number of grounding electrodes are disposed to form a second ring including a second diameter greater than the first diameter, and further electrically coupled with an electrical ground plane.

In some embodiments, the first and second number of electrodes are disposed in vias formed within a printed circuit board. For example, in FIG. 3, the biasing electrodes and floating electrodes are disposed in vias of a printed circuit board.

In an embodiment, a number of biasing circuits are operable to bias the first number of electrodes to a number of voltage levels, wherein each of the biasing circuits are coupled with at least one of the first number of electrodes. For example, in FIG. 6A, the control block 611 is coupled with at least one of the biasing electrodes and operable to bias biasing electrodes to a number of voltage levels.

In further embodiments, each of the second number of electrodes is electrically coupled with one another. For example, in FIG. 5A, each of the number of floating electrodes may be electrically coupled with one another through floating ring. In some embodiments, the first number of electrodes equals the second number of electrodes in number, and the third number of electrodes equals the sum of the number of the first and second number of electrodes. For example, in FIG. 5A, the number of biasing electrodes equals the number of floating electrodes in number, and the number of ground electrodes equals the sum of the number of the biasing and floating number of electrodes.

In an embodiment, a number of floating traces are disposed on a floating trace plane, and each of the second number of electrodes is coupled with at least one floating trace. For example, in FIG. 5A, the floating traces are disposed on a floating trace plane, and each of the number of floating electrodes is coupled with at least one floating trace.

In another embodiment, a first sensing ring and a second sensing ring may be circular with a third diameter greater than the second diameter, the first sensing ring is disposed on a plane above the floating trace plane and above at least one floating trace, and the second sensing ring is disposed on a plane below the floating trace plane and below at least one floating trace. For example, in FIG. 5A, a first sensing ring and a second sensing ring are circular with a third diameter greater than the second diameter, the first sensing ring is disposed on a plane above the floating trace plane and above at least one floating trace, and the second sensing ring is disposed on a plane below the floating trace plane and below at least one floating trace.

In a block 704, the electric field is rotated around an object at a first position, wherein the rotating revolves the positively charged region and the negatively charged region around the object through a first number of points. For example, in FIG. 4C, the electric field is rotated around an object at a first position, wherein the rotating revolves the positively charged region and the negatively charged region around the object through a first number of points along the rotational direction. In an embodiment, the rotating includes time altering a distribution of a number of electric charges on a number of biasing electrodes over the first plurality of points around the object. For example, in FIG. 4C, the distribution of a number of electric charges is time altered on the biasing electrodes, including biasing electrodes.

In a block 706, the electric field is measured at the first plurality of points around the object, wherein the measuring produces a first number of measurements measuring variations to the positively charged region and the negatively charged region. For example, in FIG. 4A, the floating electrodes measure the electric field at various points around the object to measure variations to the positively charged region and the negatively charged region.

In some embodiments, the measuring includes measuring the electric field with a number of floating electrodes. For example, in FIG. 4A, the floating electrodes measure the electric field at various points around the object to measure variations to the positively charged region and the negatively charged region.

In an embodiment, the first plurality of measurements is sampled around an approximately complete circumference of the object. For example, in FIG. 4A, the floating electrodes measure the electric field around the circumference of the object.

In a block 708, the first position of the object is calculated from the first number of measurements. For example, in FIG. 4A, the position of the object may be calculated from the first number of measurements taken by the floating electrodes.

In various embodiments, the electric field is measured at a second number of points around the object at a second position, wherein the measuring the electric field at the second number of points produces a second number of measurements, and the second position is calculated from the second number of measurements. For example, the second position may include when the electric field has rotated by one or more increments, as depicted in FIG. 4C. The second position may also include when the electric field has completed a full revolution and is again in the first position. In addition, the second position may include a second position of the object. The first and second number of measurements may be integrated to measure the electric field.

In some embodiments, the electric field is oversampled, wherein the oversampling includes taking measurements of the electric field at the first position a number of times, and wherein the oversampling is used determine a repetitive run-out component of the object, and the repetitive run-out component is removed from the measurements to determine a non-repetitive run-out component of the object. For example, in FIG. 4A, measurements of the electric field may be taken a number of times while the electric field is maintained at the same position. Further, measurements of the electric field may be taken each time the electric field has completed multiple revolutions. In FIG. 6A, the integrator and sigma-delta converter may be used to integrate and store the measurements to determine a repetitive and non-repetitive run-out component of the object.

In block 710, the calculated first position of the object is stored. According to one embodiment, at block 712, ambient noise is measured. For example, electrodes 222 that are positioned further away from the rotating disk 204 in comparison to the floating electrodes 212 may be used. It is appreciated that the signal detected by electrodes 222 is not modulated by the electric field generated by the biasing electrodes or by the rotating disk 204 because it is positioned further away from the rotating disk 204. At block 714, the measured ambient noise may be removed from the calculated first position using a difference amplifier. As such, a more accurate measurement associated with the displacement of the rotating disk 204 may be accomplished.

Figure 8:
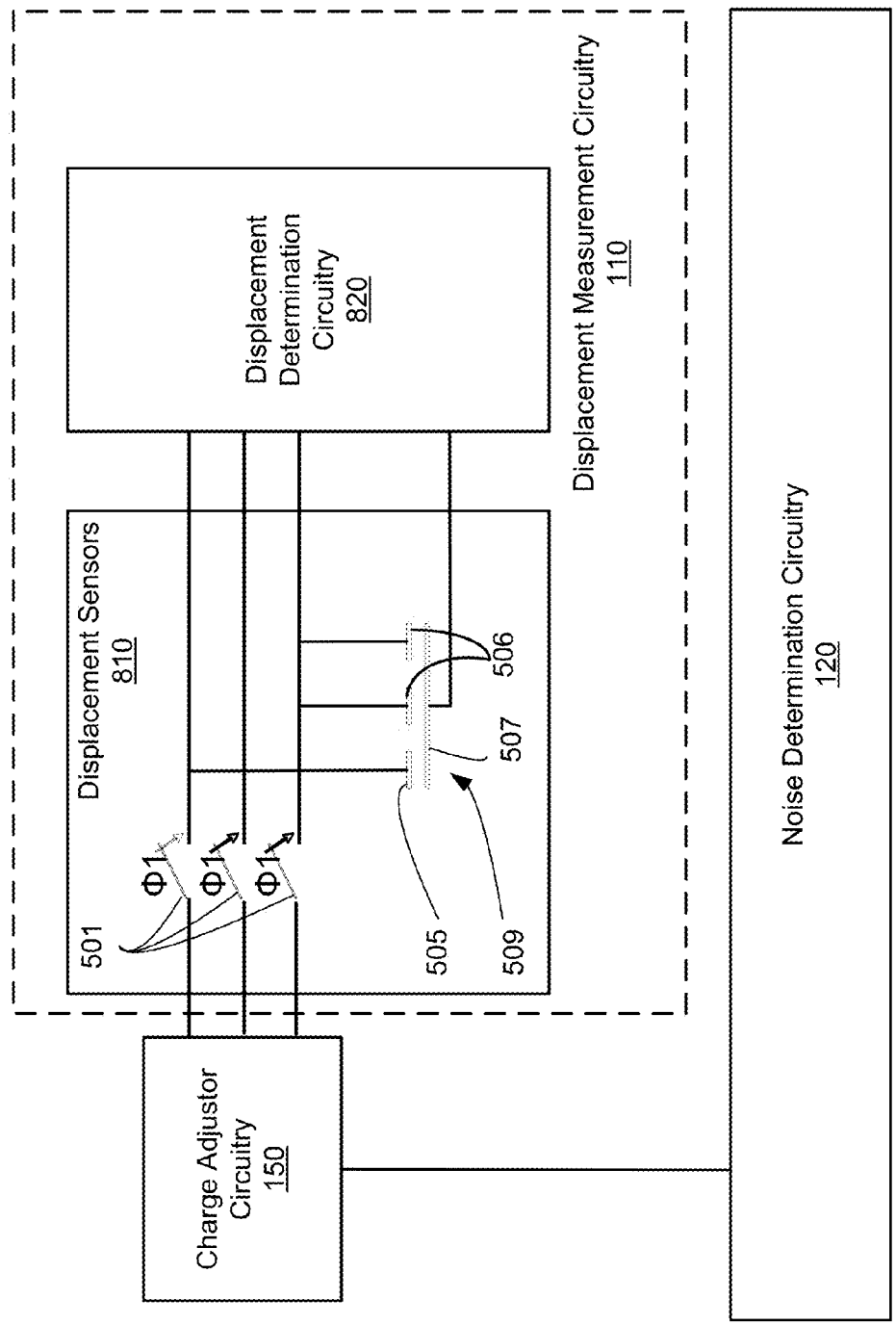
FIG. 8 shows an exemplary offset reduction circuitry associated with a displacement circuitry according to some embodiments.

Referring now to FIG. 8, an exemplary offset reduction circuitry associated with a displacement circuitry according to some embodiments is shown. In this embodiment, the charge adjustor circuitry 150 is coupled to the displacement sensors 810 of the displacement measurement circuitry 110. The displacement sensors 810 measure the electrical charges associated with the electrical field of the rotating object, as discussed above. The result of the displacement sensors 810 is transmitted to the displacement determination circuitry 820 that uses that information to determine the displacement of the rotating object.

As presented above, the charge adjustor circuitry 150 measures the offset and adjusts the charge associated with a plate of the capacitors, e.g., plates 505 and 506. In this embodiment, the charge adjustor circuitry 150 adjusts the charge on the plate by toggling the switches 501 accordingly, thereby affecting the offset of the displacement sensors 810. In other words, the set points of the capacitors measuring displacement are adjusted in order to reduce the measured offset.

It is appreciated that the charge adjustor circuitry 150 may further be coupled to the noise determination circuitry 120 and may control the charges on the plates of the sensors associated with the noise determination circuitry 120 in a similar fashion as the displacement measurement circuitry 110. It is also appreciated that the embodiment shown with respect to FIG. 8 may be reconfigured to any of the embodiments shown and discussed in FIGS. 1A-1D.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. A device comprising:
   a sensing circuitry configured to measure displacement associated with a rotating object, and wherein the sensing circuitry is further configured to measure ambient noise as the rotating object rotates;
   a charge adjuster circuitry coupled to the sensing circuitry, wherein the charge adjuster circuitry is configured to measure an offset associated with the sensing circuitry over time, and wherein the charge adjuster circuitry is further configured to adjust sensors of the sensing circuitry to reduce the measured offset; and
   an ambient noise reduction circuitry configured to remove the measured ambient noise from the measured displacement.

2. The device of claim 1, wherein the offset is associated with the measured ambient noise.

3. The device of claim 1, wherein the offset is associated with the measured displacement.

4. The device of claim 1, wherein the charge adjuster circuitry comprises an integrator.

5. The device of claim 1, wherein the charge adjuster circuitry comprises a counter configured to increment in response to the offset increasing and decrement in response to the offset decreasing.

6. The device of claim 1 further comprising:
   an integrator configured to measure an offset associated with the measured displacement after the ambient noise is removed; and
   a signal gain adjuster circuitry configured to control sensors associated with the sensing circuitry for measuring the displacement to reduce the offset associated with the measured displacement after the ambient noise is removed.

7. The device of claim 6, wherein the integrator and the signal gain adjuster circuitry are configured to reduce hysteresis associated with the sensing circuitry.

8. The device of claim 1, wherein the ambient noise reduction circuitry is a difference amplifier.

9. The device of claim 1, wherein the offset is reduced by adjusting a set point associated with a capacitance of sensors of the sensing circuitry.

10. A device comprising:
    a displacement measurement circuitry configured to measure displacement associated with a moving object;
    a noise measurement circuitry configured to measure ambient noise;
    a charge adjuster circuitry coupled to the noise measurement circuitry, wherein the charge adjuster circuitry is configured to measure an offset associated with the measured ambient noise over time, and wherein the charge adjuster circuitry is further configured to adjust sensors of the displacement measurement circuitry and further configure to adjust sensors of the noise measurement circuitry to reduce the offset associated with the measured ambient noise over time;
    an integrator configured to measure an offset associated with the measured displacement after the ambient noise is removed; and
    a signal gain adjuster circuitry configured to control sensors associated with the displacement measurement circuitry for measuring the displacement to reduce the offset associated with the measured displacement after the ambient noise is removed.

11. The device of claim 10, wherein the charge adjuster circuitry comprises an integrator.

12. The device of claim 10, wherein the charge adjuster circuitry comprises a counter configured to increment in response to the offset increasing and decrement in response to the offset decreasing.

13. The device of claim 10, wherein the integrator and the signal gain adjuster circuitry are configured to reduce hysteresis associated with the displacement measurement circuitry.

14. The device of claim 10 further comprising:
    a difference amplifier configured to remove the measured ambient noise from the measured displacement.

15. The device of claim 10, wherein the offset is reduced by adjusting a set point associated with a capacitance of sensors of the displacement measurement circuitry and further by adjusting a set point associated with a capacitance of sensors of the noise measurement circuitry.

16. A device comprising:
    a displacement measurement circuitry configured to measure displacement associated with a moving object; and
    a charge adjuster circuitry configured to measure an offset associated with ambient noise in the device over time, wherein the charge adjuster circuitry is further configured to adjust sensors to reduce the measured offset, wherein the offset is reduced by adjusting a set point associated with a capacitance of sensors of the displacement measurement circuitry.

17. The device of claim 16 further comprising:
    an integrator configured to measure an offset associated with the measured displacement after the ambient noise is removed; and
    a signal gain adjuster circuitry configured to control sensors associated with the displacement measurement circuitry to reduce the offset associated with the measured displacement after the ambient noise is removed.

18. The device of claim 17, wherein the integrator and the signal gain adjuster circuitry are configured to reduce hysteresis associated with the displacement measurement circuitry.

19. The device of claim 16, wherein the sensors are associated with the displacement measurement circuitry.

* * * * *